US008145669B2

(12) United States Patent
Cormode et al.

(10) Patent No.: US 8,145,669 B2
(45) Date of Patent: Mar. 27, 2012

(54) METHODS AND APPARATUS FOR REPRESENTING PROBABILISTIC DATA USING A PROBABILISTIC HISTOGRAM

(75) Inventors: Graham Cormode, Morristown, NJ (US); Antonios Deligiannakis, Athens (GR); Minos Garofalakis, Chania (GR); Andrew Iain Shaw McGregor, Amherst, MA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 153 days.

(21) Appl. No.: 12/636,544

(22) Filed: Dec. 11, 2009

(65) Prior Publication Data

US 2011/0145223 A1  Jun. 16, 2011

(51) Int. Cl.
*G06F 7/00* (2006.01)
*G06F 17/30* (2006.01)
(52) U.S. Cl. . 707/780; 707/722; 707/737; 707/E17.014; 707/E17.046
(58) Field of Classification Search .......... None
See application file for complete search history.

(56) References Cited

U.S. PATENT DOCUMENTS

| | | |
|---|---|---|
| 6,460,045 B1 | 10/2002 | Aboulnaga et al. |
| 6,718,346 B1 | 4/2004 | Brown et al. |
| 6,760,724 B1 | 7/2004 | Chakrabarti et al. |
| 7,177,282 B1 | 2/2007 | Gilbert et al. |
| 7,249,136 B1 | 7/2007 | Muthukrishnan et al. |
| 7,272,599 B1 | 9/2007 | Gilbert et al. |
| 7,395,270 B2 | 7/2008 | Lim et al. |
| 7,401,273 B2 | 7/2008 | Lee et al. |
| 2002/0103793 A1 | 8/2002 | Koller et al. |
| 2006/0007858 A1 | 1/2006 | Fingerhut et al. |
| 2009/0018992 A1 | 1/2009 | Zuzarte et al. |

OTHER PUBLICATIONS

Alon et al., "The Space Complexity of Approximating the Frequency Moments," Feb. 22, 2002, 19 pages.
Antova et al., "Fast and Simple Relational Processing of Uncertain Data," Saarland University Database Group, Saarbrucken, Germany, 2008, 10 pages.
Aronov et al., "Polyline Fitting of Planar Points Under Min-Sum Criteria," 2006, 17 pages.
Benjelloun et al., "An Introduction to ULDBs and the Trio System," IEEE Data Engineering Bulletin, 29(1):5-16, Mar. 2006, 12 pages.
Boulos et al., "MYSTIQ: A system for finding more answers by using probabilities," SIGMOD, Jun. 14-16, 2005, 3 pages.
Cormode et al., "Sketching Probabilistic Data Streams," SIGMOD, Jun. 11-14 2007, 12 pages.

(Continued)

*Primary Examiner* — Wilson Lee
*Assistant Examiner* — Jessica N Le
(74) *Attorney, Agent, or Firm* — Hanley, Flight & Zimmerman, LLC

(57) ABSTRACT

Methods and apparatus for representing probabilistic data using a probabilistic histogram are disclosed. An example method comprises partitioning a plurality of ordered data items into a plurality of buckets, each of the data items capable of having a data value from a plurality of possible data values with a probability characterized by a respective individual probability distribution function (PDF), each bucket associated with a respective subset of the ordered data items bounded by a respective beginning data item and a respective ending data item, and determining a first representative PDF for a first bucket associated with a first subset of the ordered data items by partitioning the plurality of possible data values into a first plurality of representative data ranges and respective representative probabilities based on an error between the first representative PDF and a first plurality of individual PDFs characterizing the first subset of the ordered data items.

18 Claims, 9 Drawing Sheets

OTHER PUBLICATIONS

Cormode et al., "Histograms and Wavelets on Probabilistic Data," 2009, 12 pages.
Dalvi et al., "Efficient Query Evaluation on Probabilistic Databases," Apr. 4, 2004, 34 pages.
Dalvi et al., "Management of Probabilistic Data Foundations and Challenges," Principles of Database Systems, Jun. 11-14, 2007, 12 pages.
Dhillon et al., "A Divisive Information-Theoretic Feature Clustering Algorithm for Text Classification," Journal of Machine Learning and Research, 2003, pp. 1265-1287.
Fournier et al., "Fitting a Step Function to a Point Set," Jun. 12, 2009, 13 pages.
Gabow et al., "Scaling and Related Techniques for Geometry Problems," ACM Symposium on Algorithms, 1984, 9 pages.
Guha et al., "Approximation and Streaming Algorithms for Histogram Construction Problems," 2006, 42 pages.
Guha et al., "REHIST: Relative Error Histogram Construction Algorithms," Proceedings of the 30th Very Large Database Conference, Toronto, Canada, 2004, 12 pages.
Yannis Ioannidis, "The History of Histograms (abridged)," Proceedings of the 29th Very Large Database Conference, Berlin, Germany, 2003, 12 pages.
Jagadish et al., "Mining Deviants in a Time Series Database," Proceedings of the 25th Very Large Database Conference, Edinburgh, Scotland, 1999, 12 pages.
Jagadish et al., "Optimal Histograms with Quality Guarantees," Proceedings of the 24th Very Large Database Conference, New York, USA, 1998, 12 pages.
Jampani et al., "MCDB: A Monte Carlo Approach to Managing Uncertain Data," SIGMOD 08, Jun. 9-12, 2008, Vancouver, BC, Canada, 14 pages.
Jayram et al., "Efficient Aggregation Algorithms for Probabilistic Data," 2007, 10 pages.
Jayram et al., "Estimating Statistical Aggregates on Probabilistic Data Streams," ACM Principles On Database Systems, Jun. 11-14, 2007, Beijing, China, 10 pages.
Muthukrishnan et al., "On Rectangular Partitionings in Two Dimensions: Algorithms, Complexity, and Applications," International Conference on Database Theory, 1999, 21 pages.
Poosala et al., "Selectivity Estimation Without the Attribute Value Independence Assumption," Proceedings of the 23rd Very Large Database Conference, Athens, Greece, 1997, 10 pages.
Sarma et al., "Towards Special-Purpose Indexes and Statistics for Uncertain Data," 2008, 15 pages.
Singh et al., "Query Selectivity Estimation for Uncertain Data," Statistical and Scientific Database Management (SSDBM), 2008, 18 pages.
Singh et al., "Database Support for Probabilistic Attributes and Tuples," 2008, 9 pages.
Cormode et al., "Probabilistic Histograms for Probabilistic Data," presentation for the 35th International Conference on Very Large Data Bases, Aug. 2009 (21 slides).
Cormode et al., "Probabilistic Histograms for Probabilistic Data," in the Proceedings of the 35th International Conference on Very Large Data Bases, Aug. 2009 (pre-publication version, 12 pages).
Cormode et al., "Probabilistic Histograms for Probabilistic Data," presentation for the 35th International Conference on Very Large Data Bases, Aug. 2009 (21 slides).

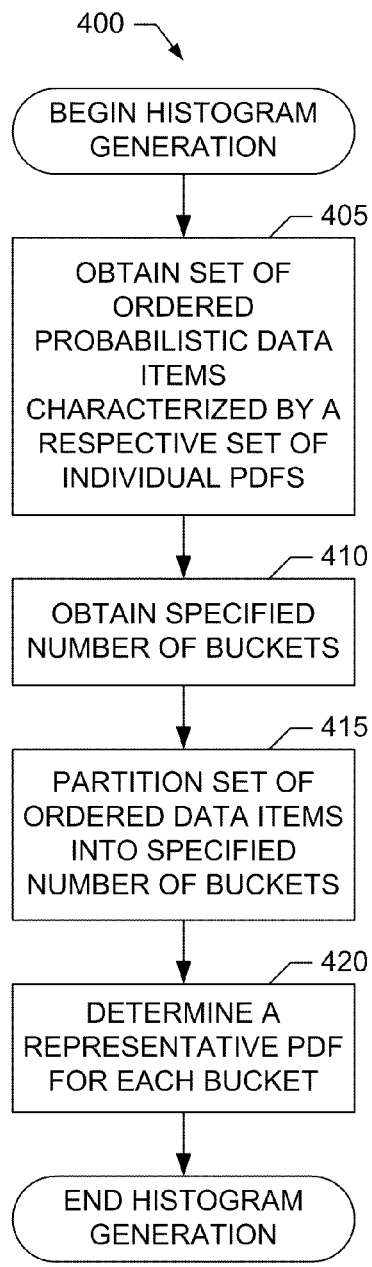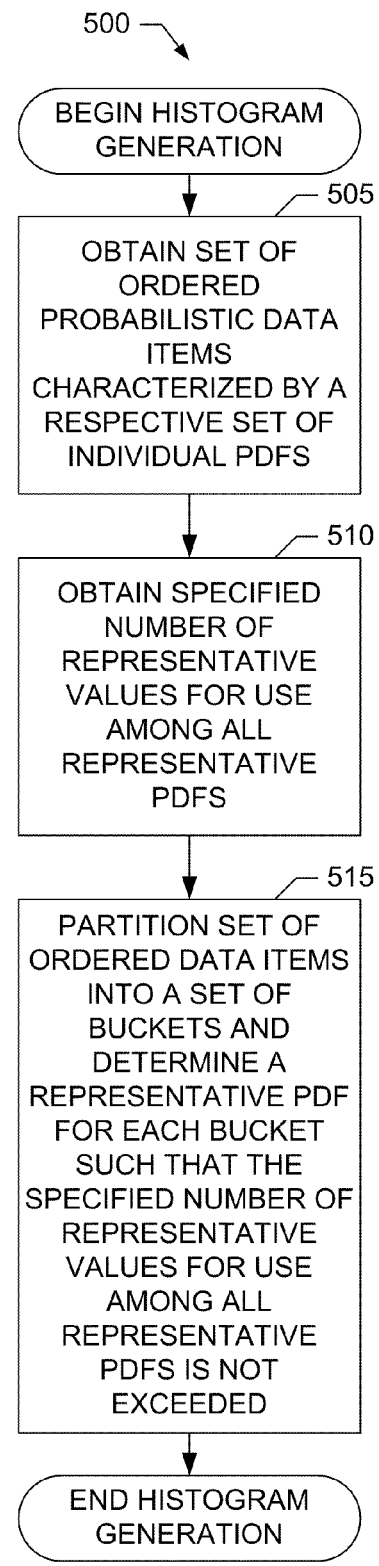
FIG. 4
FIG. 5

METHODS AND APPARATUS FOR REPRESENTING PROBABILISTIC DATA USING A PROBABILISTIC HISTOGRAM

FIELD OF THE DISCLOSURE

This disclosure relates generally to database processing and, more particularly, to methods and apparatus for representing probabilistic data using a probabilistic histogram.

BACKGROUND

Conventional database management systems (DBMSs) utilize histograms and other statistics to enable informed internal decisions (e.g., such as to determine on which attributes to build indices, and to plan and execute queries) and to provide approximate query answers for interactive data exploration and visualization. In fact, histograms are a common summarization mechanism for the deterministic data stored in conventional DBMSs, and are often provided as a synopses tool in conventional database query engines. Assuming a one-dimensional data distribution (e.g., capturing tuple frequencies over the domain of an attribute), a histogram synopsis partitions the data domain into a small number of contiguous ranges, referred to as buckets, and stores concise statistics to summarize the tuple frequencies (or probabilities) in each bucket. An example of such a concise statistic used to summarize the tuple frequencies (or probabilities) in each bucket is the value of the average bucket frequency (or probability). Typically, bucket boundaries are chosen to minimize a given error function that measures within-bucket dissimilarities and aggregates errors across buckets (e.g., using summation or maximum).

Unlike conventional DBMSs, a probabilistic DBMS stores and manages probabilistic, or uncertain, data rather than deterministic data. Unlike deterministic data having fixed (i.e., deterministic) attribute values, probabilistic data has at least one attribute that can take on one of many possible attribute values according to some probabilistic relation. As such, a probabilistic DBMS typically specifies the attribute values for a data tuple using a probability distribution over different, mutually-exclusive alternative attribute values, and assumes independence across tuples. Thus, a probabilistic database can be a concise representation for a set of probabilistic data over an exponentially large collection of possible worlds, with each possible world representing a possible deterministic, or grounded, instance of the database (e.g., determined by randomly selecting an instantiation for each probabilistic data tuple according to the data tuple's probability distribution). Because the probabilistic data has at least one uncertain (random) attribute, conventional histogram synopses expecting data with deterministic attributes are generally not applicable in a probabilistic DBMS setting.

BRIEF DESCRIPTION OF THE DRAWINGS

FIG. 4 is a flowchart representative of first example machine readable instructions that may be executed to implement probabilistic histogram generation in the probabilistic database server of FIG. 1.

FIG. 5 is a flowchart representative of second example machine readable instructions that may be executed to implement probabilistic histogram generation in the probabilistic database server of FIG. 1.

DETAILED DESCRIPTION

Figure 1:
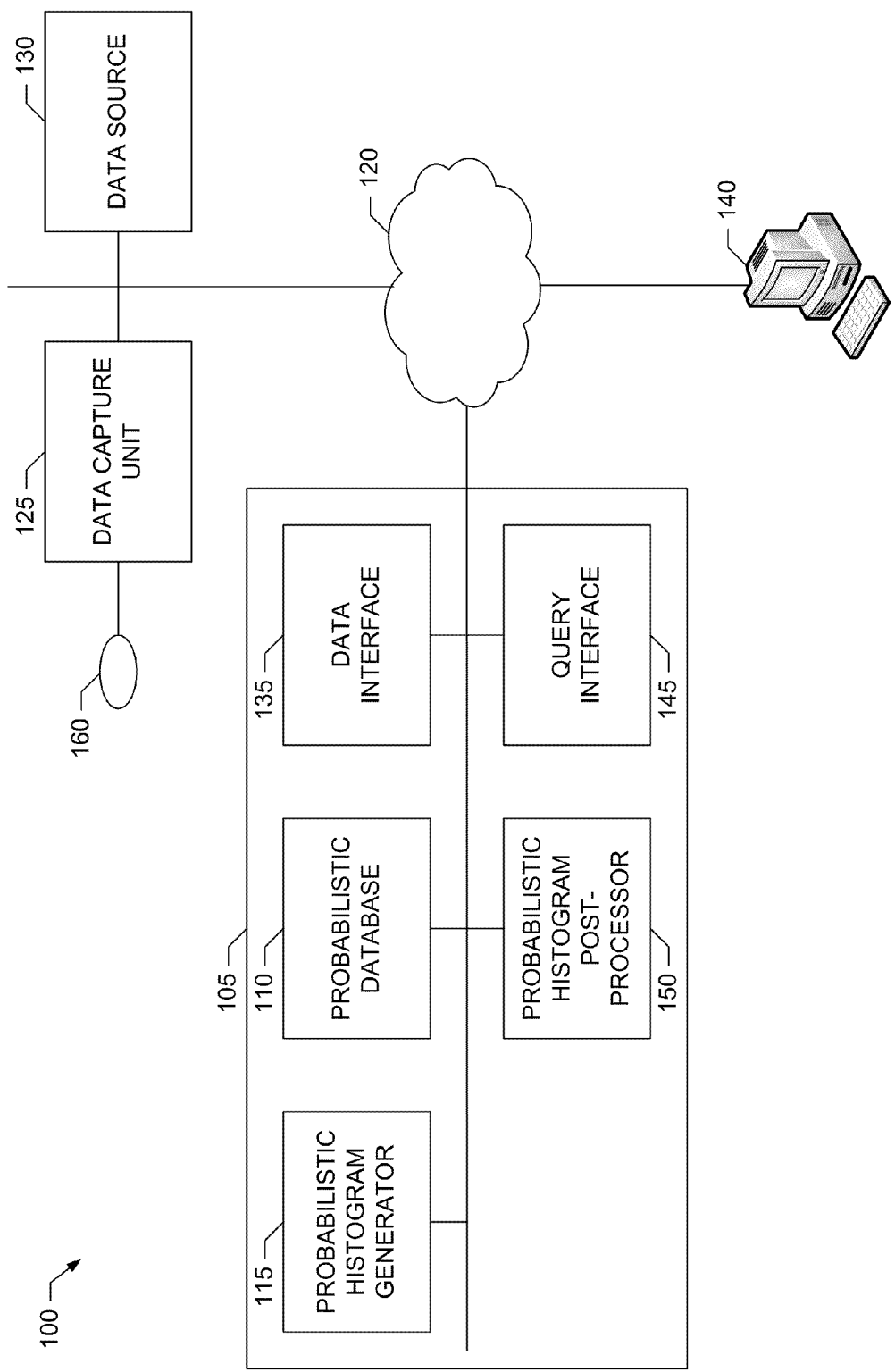
FIG. 1 is block diagram of an example environment of use for an example probabilistic database server implementing an example probabilistic database and an example probabilistic histogram generator according to the methods and/or apparatus described herein.

Methods and apparatus for representing probabilistic (or uncertain) data using a probabilistic histogram are disclosed. Many modern DBMSs manage data that contains uncertainties that are represented in the form of probabilistic relations. As such, conventional DBMS functionality needs to be adapted or redesigned to support such uncertain, or probabilistic, data. For example, many conventional DBMSs support histogram synopses of the deterministic data stored/managed by the DBMS to enable both DBMS-internal decisions (such as indexing and query planning), and approximate query processing tools (which may be user-facing). To support histogram synopsis of probabilistic data, the example methods and apparatus described herein implement probabilistic histograms that retain the possible-worlds semantics of probabilistic data, thereby allowing for more accurate, yet concise, representation of the uncertainty characteristics of data and associated query results. At a high-level, a probabilistic histogram is a histogram in which each bucket is approximately represented by a compact probability distribution function (PDF), such as a compact histogram itself. As described in greater detail below, different techniques can be used to build an optimal probabilistic histogram, each one tuned to a different choice of approximation-error metric. Furthermore, as described below, probabilistic histogram generation can be implemented using an efficient dynamic programming framework. Example performance results provided below demonstrate that the probabilistic histogram synopses described herein can accurately capture the statistical properties of uncertain data, while being more compact to store and work with than the original uncertain relations.

As described in greater detail below, an example probabilistic histogram generation method described herein involves electronically partitioning a plurality of ordered data items into a plurality of buckets in which each bucket is associated with a respective subset of the plurality of ordered data items bounded by a respective beginning data item and a respective ending data item. Additionally, each such data item is probabilistic and, thus, capable of having a particular data (e.g., attribute) value from a plurality of possible data values with a probability characterized by a respective individual PDF. Then, instead of determining a single value for each bucket as in conventional histogram techniques, the example probabilistic histogram generation method further involves electronically determining a first representative PDF, instead of a single representative value, for a first bucket associated with a first subset of the plurality of ordered data items. Furthermore, the first representative PDF is a histogram itself determined by partitioning the plurality of possible data values into a first plurality of representative data ranges and respective representative probabilities based on an error between the first representative PDF and a first plurality of individual PDFs characterizing the first subset of the plurality of ordered data items.

As another example, an apparatus described in greater detail below to generate probabilistic histograms includes an example probabilistic database to store a plurality of ordered data items. Each such data item is probabilistic and, thus, capable of having a particular value from a plurality of possible data values with a probability characterized by a respective individual PDF. The example apparatus also includes an example probabilistic histogram generator to partition the plurality of ordered data items into a plurality of buckets of the probabilistic histogram in which each bucket is associated with a respective subset of the plurality of ordered data items bounded by a respective beginning data item and a respective ending data item. The example probabilistic histogram generator also is to determine a representative PDF for each bucket in the plurality of buckets. In an example implementation, a particular representative PDF for a particular bucket is determined by partitioning the plurality of possible data values into a respective plurality of representative data ranges and respective representative probabilities to reduce (e.g., minimize) an error between the particular representative PDF and a plurality of individual PDFs characterizing the respective subset of the plurality of ordered data items associated with the particular bucket.

Conventional histograms divide the data domain into buckets and a single representative probability (or frequency) value is chosen for each bucket to minimize some error metric. Such conventional histogram summaries can be limited when applied to probabilistic information. For example, using a single representative probability value to approximately capture what are now distributions (or PDFs) of values inside a bucket loses the probabilistic, possible-worlds semantics of the original probabilistic data. This can make such a conventional histogram summary ineffective for answering certain probabilistic queries, such as selections on frequency distributions.

Unlike conventional histogram techniques which, when applied to probabilistic data, attempt to represent a bucket of PDFs with a single value, the probabilistic histogram methods and apparatus described herein use a representative PDF, instead of a single probability value, to represent a bucket in the histogram. For example, the representative PDF can be a (compact) histogram itself having some small number of piecewise-constant segments. Thus, a probabilistic histogram is a histogram in which each bucket is itself approximately represented by a representative histogram or, more generally, a representative PDF. Such a representation is complete for many types of probabilistic data in that, with a large enough space budget, it is possible to represent the original probabilistic data relationships. Furthermore, as described in greater detail below, the probabilistic histogram techniques described herein can be designed to reduce (e.g., minimize) probabilistic error metrics, such as variation distance, Kullback-Leibler divergence (relative entropy) and earth mover's distance. Thus, the probabilistic histogram techniques described herein provide a solid foundation for creating further probabilistic data summaries, which can then be used for query planning, analysis, etc.

Turning to the figures, a block diagram of an example environment of use 100 for an example probabilistic database server 105 implementing an example probabilistic database 110 and an example probabilistic histogram generator 115 according to the methods and/or apparatus described herein is illustrated in FIG. 1. The example environment of use 100 also includes an example data network 120 configured to interconnect one or more example data capture units 125 and/or one or more example data sources 130 with the probabilistic database server 105. In the illustrated example, the data capture unit(s) 125 and/or the data source(s) 130 provide uncertain data to the probabilistic database server 105 via an example data interface 135 for storage in the probabilistic database 110. The probabilistic histogram generator 115 operates to generate probabilistic histograms of the uncertain data stored in the probabilistic database 105. Additionally, the probabilistic database server 105 includes an example probabilistic histogram post-processor 150 to process one or more probabilistic histograms generated by the probabilistic histogram generator 115 in response to one or more queries, such as a selection query or a join query, received from an example interface terminal 140 via an example query interface 145. Although the example environment of use 100 depicted in FIG. 1 illustrates the probabilistic database server 105, the data capture unit(s) 125, the data source(s) 130 and the interface terminal 140 as being separate devices interconnected by the data network 120, the example methods and apparatus described herein may be used in many alternative environments in which histograms of probabilistic (or uncertain) data are to be generated and/or processed.

The data network 120 included in the example environment of use 100 may be implemented by any type of data networking technology. For example, the data network 120 may be implemented by a local area network (LAN), a wide area network (WAN), a wireless LAN and/or WAN, a cellular network, the Internet, etc., and/or any combination thereof. Additionally, the example interface terminal 140 may be implemented by any type of terminal device, such as a personal computer, a workstation, a PDA, a mobile telephone, etc. In the illustrated example, the interface terminal 140 is configured to allow a user to formulate a query, such as a selection query or a join query, for receipt via the query interface 145 of the probabilistic database server 105 using any type of database query language, technique, topology, etc. At least in some example implementations, the interface terminal 140 is also configured to allow a user to specify one of multiple techniques for generating a probabilistic histogram of some or all of the probabilistic data stored in the probabilistic database 110. Additionally, the interface terminal 140 is configured to display or otherwise present the query results, such as the generated and/or processed probabilistic histograms, returned via the query interface 145 from the probabilistic database server 105. Although the interface terminal 140 is shown as being connected to the probabilistic database server 105 via the data network 120 in the illustrated example, the interface terminal 140 alternatively could be integrated with the probabilistic database server 105.

In the example environment of use 100, potentially massive quantities of data may need to be stored in the example probabilistic database 110, which is at least one reason why determining probabilistic histogram synopses can be beneficial. However, an additional challenge in the example environment of use 100 is that the data is also inherently fuzzy or uncertain or, in other words, probabilistic. For example, the data provided by the data source(s) 130 and/or the data capture unit 125 may provide measurement data, such as sensor readings obtained from a example sensor 160. Such data is often inherently noisy and, therefore, is represented in the probabilistic database 110 by a probability distribution rather than a single deterministic value. More broadly, any type of data source 130, data capture unit 125 and/or sensor 160 can provide the probabilistic data to be stored in the example probabilistic database 110.

In an example implementation, the probabilistic database 110 employs one or more tuple-level uncertainty models and/or attribute-level uncertainty models, which specify one or more of the attribute values for a data tuple using a probability distribution over different mutually-exclusive possible alternative values that a particular attribute may have, which might also include non-existence corresponding to the tuple not being present in a particular data set realization. In such an example, the uncertainty model(s) employed by the probabilistic database 110 assumes independence across tuples. Through use of its uncertainty model(s), the probabilistic database 110 is able to provide a concise representation for a probability distribution over an exponentially large collection of possible worlds, each representing a possible deterministic (or grounded) instance of the database. Conceptually, a deterministic (or grounded) instance of the database can be viewed as flipping appropriately-biased independent coins to select an instantiation for each uncertain tuple. Due to its possible worlds nature, a query of the probabilistic database 110 typically yields a query result defining a distribution over possible query results across all possible worlds.

To manage and process the potentially large amount of probabilistic data yielding a potentially exponentially large number of possible worlds, the probabilistic database server 105 includes the probabilistic histogram generator 115 to generate histogram synopses of the probabilistic data maintained by the probabilistic database 110. Generally, histograms can be an effective summarization mechanism for conventional (i.e., deterministic) data, and are supported by many conventional DBMSs. For reference, assuming a one-dimensional data distribution (e.g., capturing tuple frequencies over the domain of an attribute), a histogram synopsis partitions the data domain into a small number of contiguous ranges, referred to herein as "buckets," and uses a single representative value to summarize the tuple frequencies in a bucket (such as the value of the average bucket frequency or probability of occurrence). The bucket boundaries are chosen to minimize a given error function that measures within-bucket dissimilarities and aggregates (e.g., using summations or maximums) errors. Although the problem of building histograms to summarize probabilistic data can be viewed as a two-dimensional histogram problem, there are additional challenges due to the probabilistic semantics. As such, naively attempting to build a two-dimensional histogram over (value, probability) data does not give meaningful results for the error metrics discussed below.

Conventional histogram summaries are limited when used to summarize probabilistic data. For example, unlike deterministic data that has fixed attribute values, each probabilistic data tuple partitioned into a particular histogram bucket can take on one of potentially many attribute values according to the individual PDF characterizing the probabilistic nature of the data tuple. As such, in the case of probabilistic data, a particular histogram bucket needs to represent a bucket of individual PDFs characterizing the different attribute values that the data tuples included in the bucket can have. However, using a single representative value to approximately capture the distributions of values inside a bucket, as in the case of conventional histograms, loses the probabilistic, possible-worlds semantics of the original probabilistic data. This can make conventional histogram summaries less effective for answering certain probabilistic queries, such as selections on frequency distributions.

Instead of using a single value to represent a bucket of PDFs, as in the case of a conventional histogram, the probabilistic histogram generator 115 utilizes to a representative PDF to represent the distribution of values within a bucket. This representative PDF can be a histogram itself, defining the representative PDF using a (possibly small) number of piecewise-constant segments. As described in greater detail below, various probabilistic error metrics, such as variation distance, Kullback-Leibler divergence (relative entropy), earth mover's distance, etc., can be used to determine the buckets and associated representative PDFs of a generated probabilistic histogram.

In an example implementation, the probabilistic histogram generator 115 summarizes probabilistic data stored and represented in the probabilistic database 110 as follows. In particular, let U represent an ordered domain indexing an uncertain relation or, in other words, an ordered indexing of a set of probabilistic data items. For simplicity, it is assumed that U is the set of integers $\{1 \ldots N\}=[N]$, so $|U|=N$. The probabilistic data corresponds to a distribution of possible worlds over this domain, with the possible worlds represented as vectors f. A single (N-dimensional) grounded vector f contains an attribute value for each member of U. Each such value is chosen from some attribute value domain V, so that $f_i \epsilon V$ (i=1, . . . , N). Let V denote the number of attribute values in V, i.e., $V=|V|$. For example, U could correspond to a set of mile-markers along a highway, with $f_i$ being the (uncertain) temperature measured at mile i on a particular day. In another example, each $f_i$ represents the frequency of item i within a given relation.

A probabilistic model defines a probability distribution over such vectors (i.e., the possible worlds). Different types of models are able to express more or less complex distributions, with the choice of model trading-off descriptive power for the size of the resulting description. A fully-general model is able to describe any possible N-dimensional probability distribution (e.g., by listing each possible world and its corresponding probability). However, instantiating such a model is complex and time consuming, due to the potentially enormous number of possible worlds requiring a number of parameters that is exponential in N. Instead, the probabilistic data is represented in the probabilistic database 110 using a model that makes certain independence assumptions to reduce the number of parameters of the model. Even if correlations exist among the probabilistic data, their impact is typically low, so ignoring them when computing summaries should have minimal effect on the quality of the summary.

For example, in the probabilistic database 110, each probabilistic data item iεU is assumed to behave independently of the other probabilistic data items. An individual item PDF $X_i$ is used to describe the distribution of probabilistic data item i. Under such a model, the probability of any given possible world f is calculated by multiplying the probability of each data item having the particular attribute data value included in the possible world. Mathematically, the probability of any given possible world f is represented as $Pr[f]=\Pi_{i \epsilon U} Pr[X_i=f_i]$. By restricting the representation of correlations across item values, the item PDF model provides a representation of the possible worlds distribution (e.g., using on the order of O(NV) parameters) that is more compact than an exponential general model. However, for large numbers of data items N and possible attribute values V, even this item PDF model can be large and unwieldy to process, thus raising the need for effective summarization techniques.

One such effective summarization technique is the probabilistic histogram generated by the probabilistic histogram generator 115. In practice, the distributions of items adjacent under the ordering of U tend to be quite similar due to the smoothness properties of real-world data distributions. This behavior underlies the reason why histogram employing contiguous buckets can be effective compact representations of the data. A histogram partitions the domain U into buckets, and all items within the same bucket are considered to behave identically to a chosen bucket representative. Such a histogram synopsis having buckets and associated bucket representatives can be more convenient to process than the original data, especially when the number of buckets is not too large. Furthermore, if the smoothness assumption does indeed hold, then the result of using a histogram in place of the original data can yield query answers that are very close to the result of those queries on the original data.

As noted above, conventional histogram summaries of probabilistic data yield a bucket representative that is a single value, possibly chosen to minimize an expected error over the possible worlds. In contrast, the probabilistic histogram generator 115 implements a richer histogram representation, referred to herein as a probabilistic histogram, in which each bucket representative is itself a compact distribution over V. By allowing compact PDFs as bucket representatives, probabilistic histogram synopses generated by the probabilistic histogram generator 115 retain a natural (albeit, approximate) possible-worlds semantics for the underlying data.

In an example implementation, the probabilistic histogram generator 115 generates a probabilistic histogram of probabilistic data stored in the probabilistic database 110 by choosing a set of B bucket boundaries, and an associated representative PDF for each bucket, that minimize some overall error function. For example, let each probabilistic histogram bucket b=(s,e) have a start point s and end point e, and cover |b|=e−s+1 probabilistic data items having respective item PDFs. To summarize the individual item PDFs $X_s, X_{s+1}, \ldots, X_e$ for the probabilistic data items inside the bucket b, the probabilistic histogram generator 115 determines a representative for the bucket b which is itself a compact PDF $\hat{X}(b)$ over the set of possible attribute values V. The accuracy with which a particular bucket representative $\hat{X}(b)$ represents the item PDFs of the data items covered by the bucket b is measured by a bucket-error metric. Letting d( ) denote a PDF distance function, which is a measure of the overall dissimilarity across two PDFs, then the bucket error for a bucket b is given by:

$$Err(b) = \bigoplus_{i=s}^{e} d(\hat{X}(b), X_i).$$ Equation 1

In Equation 1, the symbol $\oplus$ represents any appropriate aggregation operation, such as a summation or maximum operation. The resulting probabilistic histogram is then defined by a set of B buckets which span the data domain U, such that the $k^{th}$ bucket spans $b_k=(s_k,e_k)$, where $s_1=1$, $e_B=N$, and $s_k=e_{k-1}+1$ for $2 \leq k \leq B$. Using the bucket error of Equation 1, the overall probabilistic histogram error can be computed as a sum-error given by:

$$S = \sum_{k=1}^{B} Err(b_k) = \sum_{k=1}^{B} \sum_{i=s_k}^{e_k} d(\hat{X}(b_k), X_i).$$ Equation 2

Alternatively, the overall probabilistic histogram error can be computed as a max-error given by:

$$M = \max_{k=1}^{B} Err(b_k) = \max_{k=1}^{B} \sum_{i=s_k}^{e_k} d(\hat{X}(b_k), X_i).$$ Equation 3

In Equation 2 and Equation 3, the bucket error aggregation operation $\oplus$ is summation operation. In an example implementation, any, some or all of the types of bucket error aggregation operations $\oplus$ and overall histogram errors (e.g., sum-error or max-error) can be specified via the input terminal 140. Additionally or alternatively, any, some or all of the type of bucket error aggregation operations $\oplus$ and/or overall histogram errors (e.g., sum-error or max-error) can be pre-configured or hard-coded in the probabilistic histogram generator 115.

As described in greater detail below, given a particular bucket error aggregation operation (e.g., summation), a particular distance function d( ) a space-complexity bound S, and an input set of item PDFs $X_1, \ldots, X_N$ over V for a respective set of probabilistic data items, the probabilistic histogram generator 115 generates a probabilistic histogram of space complexity at most S which minimizes the overall histogram error (e.g., sum error or max error) of Equation 2 or Equation 3.

Two types of space-complexity bounds can be considered when constructing a probabilistic histogram. In the B-bucket bound, the histogram consists of exactly B buckets, each of which is represented by a detailed, V-term PDF over values V. Such a representation can be beneficial when the size of the value domain, V, is relatively small, and so each of the bucket representative PDFs is relatively small. In a B-bucket implementation, the overall space requirement of the probabilistic histogram is on the order of S=O(BV).

In the T-term bound, beneficial when V is large, each bucket-representative PDF is represented by a set of piecewise constant values (i.e., a histogram) such that the total description length of the probabilistic histogram is the total number T of such constant terms across all bucket representatives. The overall space requirement of the probabilistic histogram in the T-term implementation is on the order of S=O(T). Assuming the same overall space (i.e., T=BV), the T-term histogram implementation generalizes the corresponding B-bucket implementation and has to search over a much larger space of space allotments, but potentially yielding smaller overall approximation error. However, this can come at the cost of more complex and more expensive construction algorithms.

Figure 2:
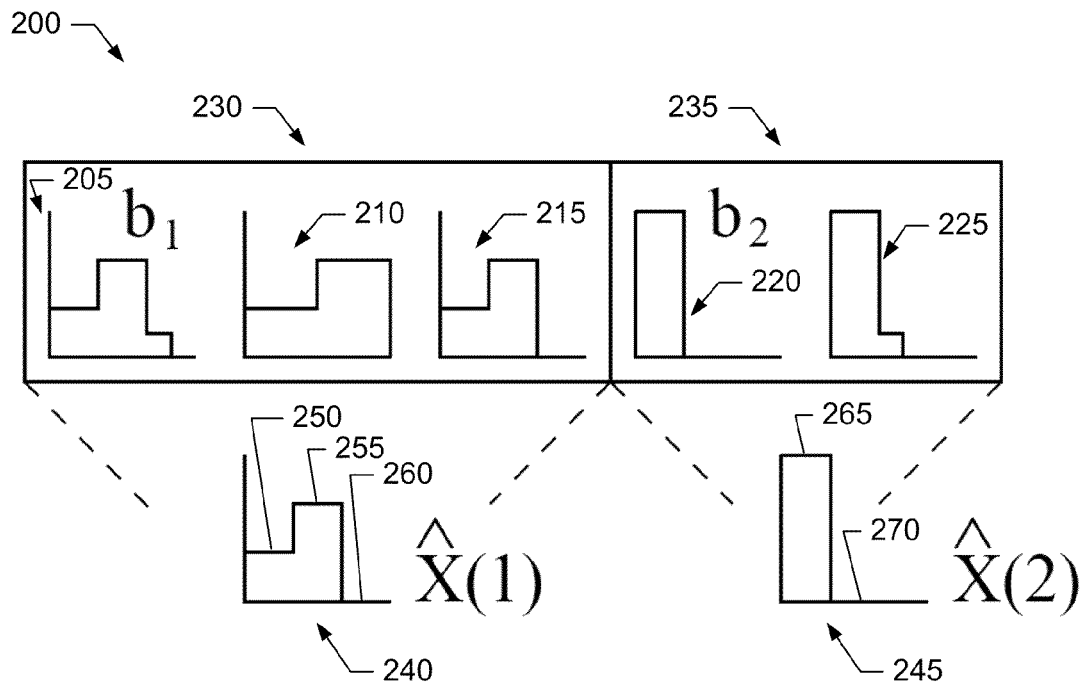
FIG. 2 illustrates and example probabilistic histogram generated by the probabilistic histogram generator of FIG. 1.

As an illustrative example, FIG. 2 depicts generation of an example probabilistic histogram 200 from an example set of N=5 probabilistic data items. The set of N=5 probabilistic data items is associated with a respective set of N=5 individual item PDFs, labeled 205, 210, 215, 220 and 225 in FIG. 2. The example probabilistic histogram has B=2 buckets 230 and 235. Bucket 230 (also labeled $b_1$) contains the ordered probabilistic data items from a starting index of 1 to an ending index of 3 and, thus, can be represented as $b_1=(1,3)$. Bucket 235 (also labeled $b_2$) contains the ordered probabilistic data items from a starting index of 4 to an ending index of 5 and, thus, can be represented as $b_2=(4,5)$. Each bucket 230 and 235 has a respective representative PDF 240 and 245 (also labeled as $\hat{X}(1)$ and $\hat{X}(2)$). In the illustrated example, the probabilistic histogram 200 corresponds to a T-term implementation having T=5 total number of terms, because the two representative PDFs 240 and 245 can be described by T=5 piecewise constant values, labeled 250, 255, 260, 265 and 270. Furthermore, as described above, the PDFs 240 and 245 are determined by minimizing an overall histogram error (e.g., such as the errors of Equation 2 or Equation 3) that is based on a first bucket error between the first representative PDF 240 and the individual item PDFs 205, 210 and 215 associated with the first bucket 230, and a second bucket error between the second representative PDF 245 and the individual item PDFs 220 and 225 associated with the second bucket 235.

Returning to the probabilistic histogram generator 115 of FIG. 1, the choice of the PDF distance metric d( ) can have significant impact on the resulting histogram generated by the probabilistic histogram generator 115. In general, the metric d is a function that takes two PDFs over the value domain V and returns a measure of their dissimilarity. Several distance metrics d can be supported by the probabilistic histogram generator 115 (e.g., with a particular distance metric specified via an input from the interface terminal 140), including but not limited to a variation distance, a sum-squared error, a Kullback-Leibler divergence, a Hellinger distance, a max-error measure and an earth mover's Distance, each of which are defined as follows.

The variation distance (also referred to as the $L_1$ distance) between two PDFs over the same value domain V is the sum of absolute differences between the probabilities of each value. Mathematically, it is given by:

$$d(X, Y) = \|X - Y\|_1 = \sum_{v \in V} |Pr[X = v] - Pr[Y = v]|. \quad \text{Equation 4}$$

The sum-squared error (also referred to as the $L_2^2$ distance) is similar to the variation distance, but takes the square of the difference of each pair of probabilities. Mathematically, it is given by:

$$d(X, Y) = \|X - Y\|_2^2 = \sum_{v \in V} (Pr[X = v] - Pr[Y = v])^2. \quad \text{Equation 5}$$

The Kullback-Leibler divergence, also known as the relative entropy, uses an information theoretic approach to compare distributions. Mathematically, it is given by:

$$d(X, Y) = KL(X, Y) = \sum_{v \in V} Pr[X = v] \log_2 \frac{Pr[X = v]}{Pr[Y = v]}. \quad \text{Equation 6}$$

Note that the Kullback-Leibler divergence is not symmetric. It is natural to consider the second argument as the representative or approximation for the first argument.

The (squared) Hellinger distance is another measure of PDF similarity. Mathematically, it is given by:

$$d(X, Y) = H^2(X, Y) = \frac{1}{2} \sum_{v \in V} (Pr[X = v]^{1/2} - Pr[Y = v]^{1/2})^2. \quad \text{Equation 7}$$

The max-error measure (also referred to as the $L_\infty$ distance) tracks the maximum difference between pairs of corresponding probabilities. Mathematically, it is given by:

$$d(X, Y) = \|X, Y\|_\infty = \max_{v \in V} |Pr[X = v] - Pr[Y = v]|. \quad \text{Equation 8}$$

For the max-error measure, in contrast to other metrics, the error of a histogram bucket is taken to be the maximum of this value over the different PDFs, rather than the sum.

The earth mover's distance in the $L_p$ metric, $EMD_p(X,Y)$, conceptually represents the probability distributions as piles of earth, and measures the difference as the total amount of work needed to convert one to the other, i.e., as the mass multiplied by the distance moved. Further properties of the earth mover's distance are described below.

While an example manner of implementing the example probabilistic database server 105 included in the example environment of use 100 has been illustrated in FIG. 1, one or more of the elements, processes and/or devices illustrated in FIG. 1 may be combined, divided, re-arranged, omitted, eliminated and/or implemented in any other way. Further, the example probabilistic database 110, the example probabilistic histogram generator 115, the example data interface 135, the example query interface 145, the example probabilistic histogram post-processor 150 and/or, more generally, the example probabilistic database server 105 of FIG. 1 may be implemented by hardware, software, firmware and/or any combination of hardware, software and/or firmware. Thus, for example, any of the example probabilistic database 110, the example probabilistic histogram generator 115, the example data interface 135, the example query interface 145, the example probabilistic histogram post-processor 150 and/or, more generally, the example probabilistic database server 105 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the appended claims are read to cover a purely software and/or firmware implementation, at least one of the example probabilistic database server 105, the example probabilistic database 110, the example probabilistic histogram generator 115, the example data interface 135, the example query interface 145 and/or the example probabilistic histogram post-processor 150 are hereby expressly defined to include a tangible medium such as a memory, digital versatile disk (DVD), compact disk (CD), etc., storing such software and/or firmware. Further still, the example probabilistic database server 105 of FIG. 1 may include one or more elements, processes and/or devices in addition to, or instead of, those illustrated in FIG. 1, and/or may include more than one of any or all of the illustrated elements, processes and devices.

Figure 3:
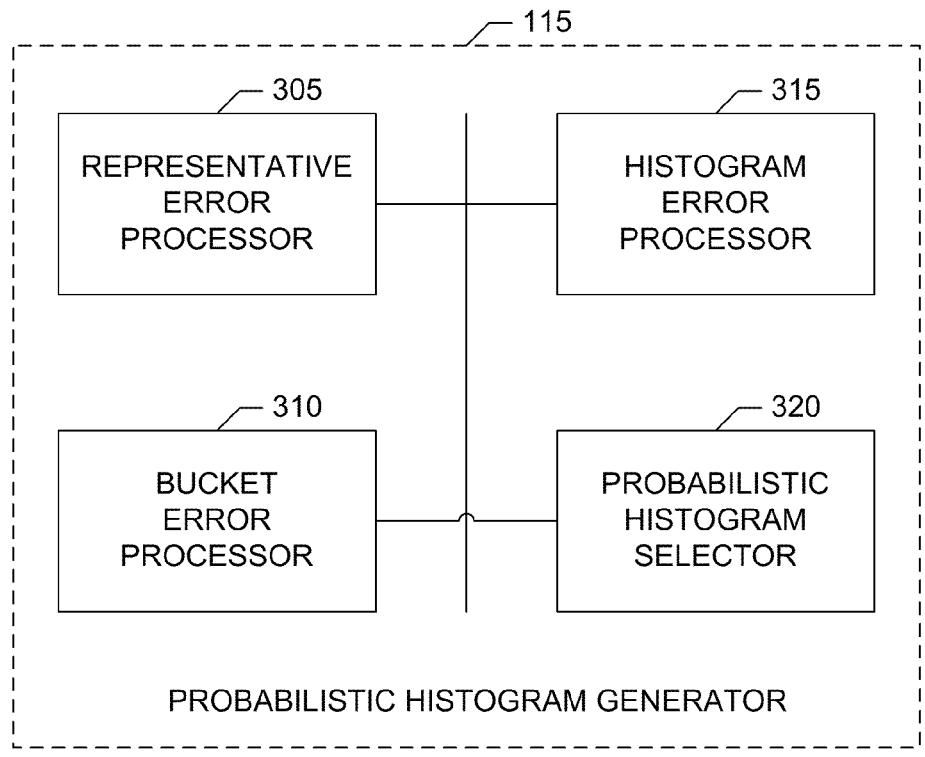
FIG. 3 illustrates an example implementation of the probabilistic histogram generator of FIG. 1.

An example implementation of the probabilistic histogram generator 115 is illustrated in FIG. 3. The probabilistic histogram generator 115 is implemented based on dynamic programming and, in a B-bucket implementation, utilizes the principle of optimality that, if the final bucket spans the ordered probabilistic data items [i . . . N], then the other B−1 buckets must form an optimal histogram for items [1 . . . i−1]. As such, dynamic programming over the choice of buckets finds the optimal probabilistic histogram by building a dynamic programming table over choices of parameters k≦B (the range of buckets) and i≦N (the range of ordered data items), and recording the cost of the optimal k-bucket histogram covering the ordered data range [1 . . . i].

For a T-term probabilistic histogram, similar dynamic programming principles can be applied, an involve building a table giving the cost of constructing the optimal k-term histogram covering the ordered data range [1 . . . i]. However, the T-term case is potentially more complex than the B-bucket case because, for each bucket considered, it is necessary to find the cost of representing it with from one (1) up to T terms.

In both B-bucket and T-term probabilistic histogram implementations, a key aspect of determining the probabilistic histogram is to determine an optimal representative PDF for a particular bucket of item PDFs defined by a bucket b having starting index s and ending index e, i.e., b=(s,e). In particular, for the B-bucket case, the goal is to find the best unrestricted (e.g., V-term) PDF that minimizes the cost of representing the PDFs in the bucket b=(s,e). In the T-term case, the goal is to find the best PDF that can be described with from one (1) up to T piecewise constant terms representing the b=(s,e).

The example dynamic programming techniques for constructing error-optimal probabilistic histograms implemented by the probabilistic histogram generator 115 of FIG. 3 are described in two parts. First, an example dynamic program for determining an optimal (piece-wise constant) representative within a fixed bucket b=(s,e) of item PDFs is described. Then, an example dynamic program that determines an overall optimal probabilistic histogram (using the earlier, bucket-specific dynamic program as a sub-process) is described for the T-term case. The same approach also can be used for the B-bucket case, except that an unrestricted PDF over V=|V| values is used to represent the item PDFs associated with each bucket.

First, to determine the optimal bucket representative for a particular possible bucket, consider a possible bucket of item PDFs b=(s,e), where s,e∈U denote the two bucket boundaries. In the T-term case, the probabilistic histogram generator 115 is to find a representative PDF of the e−s+1 PDFs in the bucket b (corresponding to the respective e−s+1 probabilistic data items covered by the bucket) having T piece-wise constant representative probability values (over V) that minimize the overall bucket error for a particular error metric d( ). Let the representative value error, ValErr(b,v,w), be the minimum possible value of the error resulting from approximating all the probability values in the attribute data value range r=(v,w) (where v,w∈V) by a best single, constant representative probability value (which is one of the piece-wise constant representative probability values making up the representative PDF in the bucket b). (As an aside, the representative value error is similar to the error in representing a set of values in a 2-dimensional (e−s+1)×(w−v+1) array by the best possible constant-value centroid.) The particular mathematical representation for the representative value error, ValErr(b,v,w), depends on the particular underlying PDF distance metric d ( ), and is described in greater detail below. In the illustrated example, the representative value error, ValErr(b,v,w), is determined by an example representative error processor 305 included in the probabilistic histogram generator 115 of FIG. 3. Based on the foregoing, the representative error processor 305 determines a particular representative value error, ValErr (b,v,w), for a respective possible (e.g., optimal) representative probability value determined for the possible attribute data value range r=(v,w) in a bucket b based on a distance metric d( ).

Next, let the representative PDF error, B−Opt$^b$[v,T], which is also referred to as the bucket error, be the optimal PDF approximation error for a portion of a possible representative PDF approximating the attribute data value range in a bucket b up to the value v∈V using at most T piece-wise constant segments. Based on the principle of optimality and assuming a sum-error bucket error metric (e.g., a summation operation as the aggregation for Equation 1), the following dynamic programming recurrence can be performed to determine B−Opt[ ]:

$$B - Opt^b[w, T] = \min_{1 \le v \le w-1} \{B - Opt^b[v, T-1] + ValErr(b, v, w)\}. \quad \text{Equation 9}$$

The case of a max-error case bucket error metric (e.g., a max operation as the aggregation for Equation 1) is handled similarly. In the illustrated example, the representative PDF error, or bucket error, B−Opt$^b$[v,T], is determined by an example bucket error processor 310 included in the probabilistic histogram generator 115 of FIG. 3. Based on Equation 9 and the foregoing, the bucket error processor 310 determines a particular representative PDF error, or bucket error, B−Opt$^b$[v, T], corresponding to a possible representative PDF approximating the attribute data value range in a bucket b up to the value v∈V using at most T piece-wise constant segments based on the respective bucket error for the best possible representative PDFs approximating the lower attribute data value ranges up to the value v−1∈V using at most T−1 piece-wise constant segments combined with the representative value error, ValErr(b,v,w), associated with approximating the remainder of the range up to v∈V using the remaining piece-wise constant segments (to yield T total segments).

The time complexity of the above dynamic programming recursion for determining the representative PDF error, or bucket error, B−Opt$^b$[v,T], depends on the time required to compute the representative value error, ValErr(b,v,w). Letting t(e−s+1,w−v+1) denote that time, the complexity of within-bucket dynamic program represented by Equation 9 is on the order of O(V$^2$Tt(e−s+1, w−v+1)) operations. In the B-bucket case, the representative PDF is allowed to fully describe the data. Hence, the computational complexity can be lower, since the search space is smaller. In fact, the cost for the B-bucket case is on the order of O(Vt(e−s+1,1)) operations to find the optimal representative for all attribute data values v∈V.

Using the within-bucket dynamic program represented by Equation 9 and implemented by the bucket error processor 310 as a sub-process, an example dynamic program that determines an overall optimal probabilistic histogram is now described. Let the histogram error, H−Opt[m,T], be the optimal error for a possible probabilistic histogram having a set of possible (e.g., optimal) buckets and respective possible (e.g., optimal) representative PDFs approximating up to the ordered data domain value m∈U and for a total space budget of T terms. Based on the principle of optimality, the following dynamic programming recurrence can be performed to determine H−Opt[m,T]:

$$H - Opt[m, T] = \min_{1 \le k \le m-1,\ 1 \le t \le T-1} \{H - Opt[k, T-t] + B - Opt^{(k+1,m)}[V+1, t]\}. \quad \text{Equation 10}$$

In the illustrated example, the histogram error, H–Opt[m,T], is determined by an example histogram error processor 315 included in the probabilistic histogram generator 115 of FIG. 3. From Equation 10 and the foregoing, the probabilistic histogram generator 115 determines the histogram error, H–Opt[m,T], based on the histogram error, H–Opt[k, T–t], for possible probabilistic histograms having possible buckets and respective representative PDFs approximating up to the lower ordered data domain values k∈U and with fewer terms T–t, combined with the representative PDF error, or bucket error, B–Opt$^b$[v,T], for possible single buckets covering the remaining ordered data domain values and using the remaining t terms.

The naive cost of evaluating the histogram error dynamic programming recurrence of Equation 10 over the N=|U| ordered data items is O(N$^2$T) evaluations of B–Opt to find the costs of each possible bucket and T value. However, because B–Opt itself is determined by the bucket error processor 310 using the dynamic programming of Equation 9, computing B–Opt$^b$[V+1,t] also generates the intermediate values of B–Opt$^b$[V+1,t'] for all 1≦t'≦t. Further, because an individual item PDF has only at most V values, there is no benefit to assigning t>V terms to a representative bucket PDF. Hence, typically only order O(N$^2$) evaluations of B–Opt$^b$[V+1,V] are needed in the T-term case. The remainder of the dynamic programming takes on the order of O(N$^2$T min(T,V)) time to compare all the possible choices of bucket boundaries and assignments of terms to a bucket.

For the B-bucket case, the dynamic programming recurrence is similar to Equation 10 but without the ranging over t. This requires on the order of O(BN$^2$) operations to range over the bucket choices, and O(N$^2$) evaluations of B–Opt$^b$[V+1, V].

As shown in FIG. 3, the probabilistic histogram generator 115 also includes a probabilistic histogram selector 320 to select the probabilistic histogram to be the set of possible buckets and respective possible representative PDFs that minimizes the histogram error, H–Opt[N,T], over all ordered data items {1 . . . N} and using all T-terms as determined by the histogram error processor 315.

Returning to the representative error processor 305 of FIG. 3, example distance metrics d( ) that can be utilized by the representative error processor 305 to determine the representative value error, ValErr(b,v,w), are now described. As mentioned above, examples of distance metrics d( ) that can be utilized by the representative error processor 305 include, but are not limited to, a sum-squared error (also referred to as the $L_2^2$ distance), a Kullback-Leibler divergence, a variation distance (also referred to as the $L_1$ distance), a squared Hellinger distance, a max-error measure (also referred to as the $L_\infty$ distance), and an earth mover's distance.

To develop the sum-squared error distance metric, consider an attribute value range r=(v,w) (where v,w∈V) within a bucket b=(s,e) that is to be represented a single representative probability value p making up the representative PDF for the particular bucket. For the sum-squared error distance metric, the contribution of this approximation to the bucket error is $$\sum_{i=s}^{e}\sum_{j=v}^{w}(Pr[X_i = j] - p)^2.$$

Differentiating with respect to p shows that this error is minimized by setting the single representative probability value p to the optimal value $\bar{p}$, given by:

$$p = \bar{p} = \frac{\sum_{i=s}^{e}\sum_{j=v}^{w}Pr[X_i = j]}{(e - s + 1)(w - v + 1)},$$

Equation 11 which is the average of the relevant probabilities. The resulting representative value error, ValErr(b,v,w), for this optimal representative probability value $\bar{p}$ is then given by:

$$\begin{aligned}ValErr(b, v, w) &= \sum_{i=s}^{e}\left(\sum_{j=v}^{w}(Pr[X_i = j])^2 - 2\bar{p}Pr[X_i = j] + \bar{p}^2\right) \\ &= \sum_{i=s}^{e}\left(\sum_{j=v}^{w}(Pr[X_i = j])^2\right) - \\ &\quad \bar{p}^2(e - s + 1)(w - v + 1)\end{aligned}$$

Equation 12

For a T-term probabilistic histogram implementation, ValErr(b,v,w) can be computed from Equation 12 quickly based on O(VN) precomputed values as follows. Define the following quantities:

$$A[e, w] = \sum_{i=1}^{e}\sum_{j=1}^{w}Pr[X_i = j]$$

Equation 13 and $$B[e, w] = \sum_{i=1}^{e}\sum_{j=1}^{w}(Pr[X_i = j])^2.$$

Equation 14

Then, using Equation 13 and Equation 14, it can be shown that:

$$\bar{p}[(s, e), (v, w)] \cdot (e - s + 1)(w - v + 1) = \\ (A[e, w] - A[s - 1, w] - A[e, v - 1] + A[s - 1, v - 1])$$

Equation 15 and $$\sum_{i=s}^{e}\sum_{j=v}^{w}(Pr[X_i = j]) = \bar{p}[(s, e), (v, w)] \cdot (e - s + 1)(w - v + 1).$$

Equation 16

From Equation 15 and Equation 16, ValErr(b,v,w) can be computed by the representative error processor 305 in constant time.

Also, it can be shown that the representative PDF generated by the probabilistic histogram generator 115 using the sum-squared error distance is indeed a valid PDF. From Equation 11, each optimal representative probability value $\bar{p}$ is in the range [0,1], since it is the mean of other probability values. Then, for a set of intervals I={(v,w)} that partition V, the cumulative probability is given by $$\sum_{(v,w)\in I}\sum_{j=v}^{w}\bar{p}[(s, e), (v, w)] = \sum_{(v,w)\in I}(w - v + 1) \\ \frac{\sum_{j=v}^{w}\sum_{i=s}^{e}Pr[X_i = j]}{(e - s + 1)(w - v + 1)}$$

Equation 17

$$= \sum_{i=s}^{e} \sum_{j=v}^{w} \frac{Pr[X_i = j]}{e - s + 1}$$

$$= \sum_{i=s}^{e} \frac{1}{e - s + 1}$$

$$= 1$$

For a B-bucket probabilistic histogram implementation, the representative value error ValErr(b,v,v) for a particular attribute value v can be computed by the representative error processor 305 in constant time based on O(N) precomputed values. The B-bucket case is similar to the T-term case but where a distinct representative probability $\bar{p}$ is determined for each v∈V. This generates a representative PDF X for the bucket b where $Pr[X=v]=\Sigma_{i=s}^{e} Pr[X_i=v]/(e-s+1)$, which is the average of the individual item PDFs for the attribute value v. From this, the representative value error ValErr(b,v,v) for the B-bucket case is given by:

$$ValErr(b, v, v) = \sum_{i=s}^{e}\sum_{j \in V}(Pr[X_i = j])^2 - Pr[X = v]^2(e - s + 1). \quad \text{Equation 18}$$

By precomputing O(N) values in time O(NV) given by:

$$A[e] = \sum_{i=1}^{e}\sum_{j=1}^{V} Pr[X_i = j] \quad \text{Equation 19}$$

and $$B[e] = \sum_{i=1}^{e}\sum_{j=1}^{V} (Pr[X_i = j])^2 \quad \text{Equation 20}$$

it can be shown that the representative value error ValErr(b,v,w) for the B-bucket case is given by:

$$ValErr(b, v, v) = B[e] - B[s - 1] - \frac{(A[e] - A[s - 1])^2}{e - s + 1}. \quad \text{Equation 21}$$

The arrays A and B can be computed by the representative error processor 305 in O(VN) operations.

Using the preceding results for computing ValErr(b,v,w) for the T-term case in the dynamic programming framework described above, the optimal T-term probabilistic histogram can be determined by the probabilistic histogram generator 115 under the sum-squared error distance metric in time on the order $O(N^2T(\min(T,V)+V^2))$ operations. Similarly, using the preceding results for computing ValErr(b,v,v) for the B-bucket case in the dynamic programming framework described above, the optimal B-bucket probabilistic histogram can be determined by the probabilistic histogram generator 115 using the sum-squared error distance metric in time on the order of O(N(BN+V)) operations.

To develop the Kullback-Leibler divergence distance metric, it can be shown that the representative PDF X that minimizes Kullback-Leibler divergence distance $$\sum_{i=s_k}^{e_k} KL(X_i, X)$$

is the average of the individual item PDFs $\{X_i\}_{s_k \leq i \leq e_k}$, that is, $$(e_k - s_k + 1)^{-1}\sum_{i=s_k}^{e_k} X_i.$$

Consequently, the development of the B-bucket case for Kullback-Leibler divergence distance metric follows the development of the sum-squared error distance, with the same costs.

To develop the variation distance metric, recall that the variation distance between two PDFs is the sum of the absolute difference in probabilities for each value. In the T-term case, for given a bucket b and a range of values r=(v,w), the contribution to the error when choosing a representative probability value p can be written as $ValErr(b,i,j)=\Sigma_{i=s}^{e}\Sigma_{j=v}^{w}|Pr[X_i=j]-p|$. For minimization problems of this form, it is straightforward to show that the optimal solution is to choose the representative probability value p as:

$$p = p_{med} = \text{median}_{\substack{s \leq i \leq e \\ v \leq j \leq w}} Pr[X_i = j]. \quad \text{Equation 22}$$

Assuming for simplicity of notation that the median is unique and the number of items is even, the representative value error can then be written as:

$$ValErr(b, v, w) = \sum_{i=s}^{e}\sum_{j=v}^{w} Pr[X_i = j] - 2I(i, j)Pr[X_i = j] \quad \text{Equation 23}$$

where I(i,j) is 1 if $Pr[X_i=j] \leq p_{med}$, and 0 otherwise.

Thus, the core problem in determining the variation distance metric is to determine the sum of a set of items smaller than the median. In the dynamic programming framework for probabilistic histogram determination, the value of this quantity is needed for every contiguous range of values and for every choice of bucket. This problem can be formalized and analyzed as follows. The two-dimensional range-sum-median problem is, given a two-dimensional array A of m×n values, find:

$$med(a, b, c, d) = \text{median}_{\substack{a \leq i \leq c \\ b \leq j \leq d}} A[i, j] \quad \text{Equation 24}$$

and $$ms(a, b, c, d) = \sum_{\substack{a \leq i \leq c \\ b \leq j \leq d \\ A[i,j] \leq med(a,b,c,d)}} A[i, j] \quad \text{Equation 25}$$

for all $1 \leq a \leq c \leq m$ and $1 \leq b \leq d \leq n$. It can be solved in time $O((mn)^2\min(m,n)\log(mn))$. The one-dimensional range-sum-median problem is the corresponding problem for a one dimensional array A of n values (e.g., it is an instance of the two-dimensional problem with m=1). It can be solved in time $O(n^2 \log n)$.

The preceding time bounds can be found as follows. First consider the one-dimensional version of the problem to find med(a,c) and ms(a,c) for all ranges. Note that this can be solved efficiently incrementally by fixing the value of a and stepping through the values of c. The (multi)set of values of A[j] can be stored in a dynamic dictionary structure such as an Adelson-Velskii-Landis (AVL) tree, from which the desired quantities can be determined by tracking the number of items and sum of values within each subtree. Increasing c by one adds a new item to the tree, and so the total cost is O(log n) per update. Over the $n^2$ updates, the total cost is $O(n^2 \log n)$. Note that, if all values are to be found, then the cost must be $\Omega(n^2)$, so this simple solution is near optimal.

The two-dimensional case is quite similar. Assuming $m \leq n$, for each of the O(mn) values of [a,b], a value of d is fixed. Then each possible value of c is considered in turn. Each new value of c adds O(m) new items into the tree, with cost O(log mn) per item. Again, the number of items and sum of values within each subtree is tracked, allowing the value of med(a,b,c,d) and ms(a,b,c,d) to be found. The total cost is then $O((mn)^2 m \log(mn))$. For m>n, similar operations are performed but the roles of c and d are interchanged, giving cost $O((mn)^2 n \log(mn))$. The asserted time bound then follows.

Observe that in the T-term probabilistic histogram implementation utilizing variation distance, the dynamic programming framework has to find the cost of each range defined by a sub-bucket and a range of the value domain. Thus, the dynamic programming framework requires all the values generated by an instance of the two-dimensional range-sum-median problem. Once these have been computed in time $O((VN)^2 \min(V,N) \log(VN))$, the dynamic programming framework can find the cost of a combination of bucket and value range in constant time. For example, the dynamic program builds a table of size O(NT) in time proportional to $O(N^2 T \min(T,V))$. In the B-bucket case, the dynamic programming framework is somewhat simplified. Given a bucket b, the optimal representation is found by finding the median of the (e−s+1) probabilities, for each of the V values. This can be aided by carrying out V parallel instances of the one-dimensional range-sum-median problem, one for each of the V values, in time $O(VN^2 \log N)$. The dynamic programming framework then builds a table of size O(N) in time $O(BN^2)$. Thus, in summary, the optimal T-term probabilistic histogram utilizing the variation distance can be found in time $O(N^2(T \min(T,V) + V^2 \min(V,N) \log(VN)))$, and the optimal B-bucket probabilistic histogram utilizing the variation distance can be found in time $O(N^2(B + \log(VN)))$.

While a representative PDF formed from the representative probability values determined using Equation 22 based on the variation distance metric minimizes the sum of absolute errors, the resulting representative PDF for a bucket is not necessarily a PDF. In other words, the sum of the representative probability values determined using Equation 22 may not be one (1), as shown in the following example. Consider a bucket containing a single item PDF over V={1,2,3,4,5} given by Table 1:

TABLE 1

| x | 1 | 2 | 3 | 4 | 5 |
|---|---|---|---|---|---|
| Pr[X = x] | 0 | 0 | 11/81 | 50/81 | 20/81 |

The optimal representative PDF for this bucket using variation distance with T=2 is given by Table 2:

TABLE 2

| x | 1 | 2 | 3 | 4 | 5 |
|---|---|---|---|---|---|
| Pr[X = x] | 0 | 0 | 20/81 | 20/81 | 20/81 |

However, the values in Table 2 do not sum to 1. Instead, an optimal normalized representative PDF based on variation distance for the bucket of Table 1 is given by Table 3:

TABLE 3

| x | 1 | 2 | 3 | 4 | 5 |
|---|---|---|---|---|---|
| Pr[X = x] | 0 | 0 | 0 | 1/2 | 1/2 |

Thus, while the variation distance metric can yield a good representative PDF of the data, which minimizes a desired error metric, it is not normalized. As such, it could cause unexpected results if passed on to other computations which expect a normalized PDF (i.e., that sums to 1) as input.

It is straightforward to rescale a representative PDF summary so that it is normalized (i.e. so that it sums to 1). However, the example above shows that the optimal normalized representative PDF summary is not necessarily a scaled version of the optimal unnormalized one. Nevertheless, let Y denote the optimal non-normalized bucket representative PDF (e.g. the solution found by the above dynamic programming frameword), and consider the rescaled PDF $Z=Y/\mu$. Note that Z has the same space complexity as Y, and $\|Z-Y\|_1 = |1-\mu|$. Furthermore, for each summarized item PDF $X_i$, we have $\|Y-X_i\|_1 \geq |\|Y\|_1 - \|X_i\|_1| = |1-\mu|$ since $\|X_i\|_1 = 1$. Therefore, by the triangle inequality:

$$\sum_{i=s}^{e} \|Z - X_i\|_1 \leq \sum_{i=s}^{e} \|Z - Y\|_1 + \|Y - X_i\|_1 \leq 2 \sum_{i=s}^{e} \|Y - X_i\|_1. \quad \text{Equation 26}$$

From Equation 26, it can be seen that a normalized bucket representative PDF Z formed by rescaling the non-normalized representative PDF has error that is at most a factor of two from optimal (because the non-normalized representative PDF Y gives a lower bound on the error of the optimal normalized solution).

Alternatively, a tighter normalized representative PDF (e.g., having less error) can be found by adding a dimension to the dynamic programming table. Let $B-Opt^b[w,T,u]$ denote the minimum error up to attribute data value $v \in V$ using at most T terms such that the representative probability values for attribute data values 1, . . . , v sum up to $\mu$. Note that $B-Opt^b[V,T] = B-Opt^b[V,T,1]$ and can be found using the following recursion:

$$B - Opt^b[w, T, \mu] = \min_{1 \leq v \leq w-1,\ 0 < v < \mu} \quad \text{Equation 27}$$
$$\{B - Opt^b[v, T-1, \mu - v] + ValErr(b, v, w, v)\},$$

where ValErr(b,v,w,v) is the error incurred by using value $(\mu-v)/(w-v+1)$ to approximate the values in the 2-dimensional $(e-s+1) \times (w-v+1)$ array. This recursion requires minimization of the continuous variable v, which may not be computationally feasible. Instead, values are rounded to members of the following sets:

$$S_1 = \left\{0, \frac{\varepsilon}{T}, \frac{2\varepsilon}{T}, \ldots, 1\right\},$$

$$S_2 = \left\{0, \frac{\varepsilon}{T}, \frac{(1+\varepsilon)\varepsilon}{T}, \frac{(1+\varepsilon)^2\varepsilon}{T}, \ldots, 1\right\}.$$

Equation 28

Next, a table $\Psi[v,t,\mu]$ is computed for $v \in V, t \in [T], \mu \in S_1$ so that:

$$|B\text{-}Opt^b[w,t,\mu] - \Psi[w,t,\mu]| \leq 3\epsilon t/T + \epsilon\mu.$$

Equation 29

Consequently, B–Opt$^b$[v,t] is computed while enforcing that the representative PDF is normalized, and has additive error at most 4ϵ for any t≤T. $\Psi[w,t,\mu]$ is defined by the following recursion:

$$\Psi[w, t, \mu] = \min_{1 \leq v \leq w-1, v < \mu: v \in S_2}$$

Equation 30

$$\{\Psi[v, t-1, f(\mu - v)] + ValErr(b, v+1, w, v)\},$$

where $f(x) = \min\{x' \in S_1 : x \leq x'\}$. Let $g(x) = \min\{x' \in S_2 : x \leq x'\}$. For $0 \leq x \leq 1$, note that $f(x) - x \leq \epsilon/T$ and $g(x) - x \leq \epsilon/T + \epsilon x$. The validity of Equation 29 can be shown by induction on t. For $t=1$, $\Psi[v,1,\mu] = B\text{-}Opt^b[v,1,\mu]$. For fixed $v < w \in V$, $t \in [T], \mu \in S_1$, suppose $v = v^* \leq \mu$ minimizes $$B\text{-}Opt^b[v,t-1,\mu-v] + ValErr(b,v+1,w,v).$$

Equation 31

Then:

$$\Psi[v,t-1,f(\mu-v^*)] + ValErr(b,v+1,w,g(v^*)) \leq B\text{-}Opt^b[v,t-1,f(\mu-v^*)] + 3\epsilon(t-1)/T + \epsilon f(\mu-v^*) + ValErr(b,v+1,w,v^*) + \epsilon(v^*+1/T) \leq B\text{-}Opt^b[v,t-1,\mu-v^*] + \epsilon/T + 3\epsilon(t-1)/T + \epsilon(\mu-v^*+1/T) + ValErr(b,v+1,w,v^*) + E(v^* + 1/T) = B\text{-}Opt^b[v,t-1,\mu-v^*] + ValErr(b,v+1,w,v^*) + 3\epsilon t/T + \epsilon\mu$$

Equation 32

In Equation 32, the first inequality follows by the induction hypothesis and the triangle inequality in conjunction with a property of g. The second inequality uses the triangle inequality in conjunction with a property of f. Note that each of the $O(VT^2\epsilon^{-1})$ values of $\Psi[\ldots]$ can be computed in $O(V \log(T\epsilon^{-1}))$ time. Using the dynamic programming recurrence, an ϵ-error (normalized) approximation to the optimal T-term probabilistic histogram under variation distance can be found in time $O(N^2T^3V^2\epsilon^{-1} \log(T\epsilon^{-1}))$. An ϵ-error (normalized) approximation to the optimal B-bucket histogram can be found in time $O(N^2BV^4\epsilon^{-1} \log(T\epsilon^{-1}))$.

To develop the squared Hellinger distance metric, consider an attribute value range $r=(v,w) \subset V$ within a bucket $b=(s,e)$ that is to be represented with a single representative probability value p that will be part of the set of piece-wise constant probability values making up the representative PDF for the bucket. The squared Hellinger distance between the item PDFs at the attribute values in the range $r=(v,w) \subset V$ and the representative probability value p within the bucket $b=(s,e)$ is given by:

$$\sum_{i=s}^{e} \sum_{j=v}^{w} \frac{(\sqrt{Pr[X_i = j]} - \sqrt{p})^2}{2}.$$

Equation 33

Differentiating Equation 33 with respect to p demonstrates that the representative probability value p can be minimized by setting it to an optimal representative probability value $\bar{p}$ given by:

$$p = \bar{p} = \left(\frac{\sum_{i=s}^{e} \sum_{j=v}^{w} \sqrt{Pr[X_i = j]}}{(e-s+1)(w-v+1)}\right)^2.$$

Equation 34

It can be shown that the representative value error for representing a range of values in a particular bucket using an optimal representative probability value $\bar{p}$ determined under the squared Hellinger distance in the T-term case can be found in constant time using O(VN) precomputed values. To show this, consider a range $r=(v,w)$ (where $v,w \in V$) within a bucket $b=(s,e)$ that we wish to represent with a single probability value p. The representative value error for the optimum value $\bar{p}$ is then:

$$ValErr(b, v, w) =$$

Equation 35

$$\sum_{i=s}^{e} \sum_{j=v}^{w} (Pr[X_i = j] - 2\sqrt{\bar{p}} \sqrt{Pr[X_i = j]} + \bar{p}) =$$

$$\sum_{i=s}^{e} \sum_{j=v}^{w} Pr[X_i = j] - (e-s+1)(w-v+1)\bar{p}$$

This expression for ValErr(b,v,w) is similar in form to the expression obtained for sum squared error. Hence, this representative value error can be computed quickly by the representative error processor 305 based on O(VN) precomputed quantities in a similar manner. For example, define the following precomputed quantities:

$$A[e, w] = \sum_{i=1}^{e} \sum_{j=1}^{w} \sqrt{Pr[X_i = j]}$$

Equation 36 and $$B[e, w] = \sum_{i=1}^{e} \sum_{j=1}^{w} Pr[X_i = j]$$

Equation 37

Then, the optimum representative probability value $\bar{p}$ can be determined as:

$$\bar{p}[(s, e), (v, w)] \cdot (e-s+1)(w-v+1) =$$

Equation 38

$$\frac{(A[e, w] - A[s-1, w] - A[e, v-1] + A[s-1, v-1])^2}{(e-s+1)(w-v+1)}$$

and $$\sum_{i=s}^{e} \sum_{j=v}^{w} Pr[X_i = j] =$$

Equation 39

$$B[e, w] - B[s-1, w] - B[e, v-1] + B[s-1, v-1])$$

Similarly, by pre-computing and storing the values of A[e,V] and B[e,V], the optimal representative value error for representing a range of values in a particular bucket using an optimal representative probability value $\bar{p}$ determined under the squared Hellinger distance in the B-bucket case can be found in constant time using O(N) precomputed values. Also, in both the T-term and B-bucket cases, the arrays A and B can be computed in O(VN) time. In the T-term case this is dominated by the cost of the overall dynamic programming, and so can be ignored.

Based on the foregoing, the optimal T-term probabilistic histogram under squared Hellinger distance can be determined in time $O(N^2 T(\min(T,V)+V^2))$. The optimal B-bucket probabilistic histogram can be determined in time $O(N(BN+V))$. As in the variation error case, the resulting representative PDFs in the probabilistic histogram are not guaranteed to be a true PDFs, i.e., the probabilities do not necessarily sum to 1. The approaches described above in the context of the variation distance metric can be used to determine representative PDFs under the squared Hellinger distance that are normalized.

The max error distance metric represents the maximum deviation between two distributions. To develop the max error distance distance metric, consider an attribute value range $r=(v,w)$ within a bucket $b=(s,e)$ that is to be represented with a single representative probability value $p$ that will be part of the set of piece-wise constant probability values making up the representative PDF for the bucket. The max error distance between the item PDFs at the attribute values in the range $r=(v,w) \subset V$ and the representative probability value $p$ within the bucket $b=(s,e)$ is given by:

$$\max_{\substack{s \le i \le e \\ v \le j \le w}} |Pr[X_i = j] - p|. \qquad \text{Equation 40}$$

The max error of Equation 40 is minimized by setting $p$ to an optimal representative probability value $\bar{p}$ given by:

$$p = \frac{1}{2}\left(\max_{\substack{s \le i \le e \\ v \le j \le w}} Pr[X_i = j] + \min_{\substack{s \le i \le e \\ v \le j \le w}} Pr[X_i = j]\right) \qquad \text{Equation 41}$$

Finding the optimal representative probability value $\bar{p}$ can be viewed as a dual problem: given a deviation $\epsilon$, to find a representation X of the PDFs $X_s \ldots X_e$ so that $\max_{s \le i \le e} \|X - X_i\|_\infty \le \delta$ using as few subbuckets as possible. This can be solved with a single pass over the PDFs in the bucket. First, if there is any j such that $\max_{s \le i \le e} Pr[X_i = j] - \min_{s \le i' \le e} Pr[X_{i'} = j] \ge 2\delta$, then there is no solution for this choice of $\delta$ and bucket b. Otherwise, begin with the first subbucket at value 1, and for each subbucket defined by a range $r=(v,w)$, track $$\alpha = \max_{\substack{s \le i \le e \\ v \le j \le w}} Pr[X_i = j] \qquad \text{Equation 42}$$

and $$\beta = \min_{\substack{s \le i \le e \\ v \le j \le w}} Pr[X_i = j] \qquad \text{Equation 43}$$

If the current subbucket $(v,w)$ has $\alpha - \beta > 2\delta$, then the current subbucket is terminated at $[v, w-1]$, and new subbucket is opened at $[w,w]$. At the end of this process, the smallest possible number of subbuckets will have been opened while guaranteeing that the max error is at most $\delta$, achieved by setting $p=(\alpha+\beta)/2$. The problem in the T-term case of finding a solution with at most T subbuckets can therefore be solved by (binary) searching over values of $\delta$. This process can be made efficient by observing that only the maximum and minimum item PDF values for each $v \in V$ are needed. Using appropriate data structures, these maximum and minimum item PDF values can be found for any bucket in constant time per query after linear time preprocessing.

A more sophisticated argument can be applied to show that it suffices to search over only $O(V^2)$ different possible values of $\delta$ and moreover that this search can be done efficiently in total time $O(V)$. For the B-bucket case, the smallest value of $\delta$ for a bucket b is:

$$\max_{1 \le v \le V}\left(\max_{s \le i \le e} Pr[X_i = v] - \min_{s \le i \le e} Pr[X_i = v]\right), \qquad \text{Equation 44}$$

which gives the cost of picking that bucket. This value is found for a given bucket by finding for the minimum and maximum item PDF values in the range $s \ldots e$, for each value $v \in V$. Therefore, using any appropriate range search structure, the total query time is $O(BVN^2)$.

From the foregoing, the optimal T-term probabilistic histogram under a max-error distance metric can be determined in time $O(TVN^2)$. The optimal B-bucket probabilistic histogram can be determined in time $O(BVN^2)$. As in the variation error case, the resulting representative PDFs in the probabilistic histogram are not guaranteed to be true PDFs (i.e., the probabilities do not necessarily sum to 1). The approaches described above in the context of the variation distance metric can be used to determine representative PDFs under the max error distance that are normalized.

The formal definition of the earth mover's distance between two distributions is based on a transfer function $\phi(v,w)$, which specifies how much "mass" to move from a value $v$ to a value $w$. Then the error for a given $\phi$ with $L_p^p$ distance on the value domain is given by $\Sigma_{v,w \in V} \phi(v,w) |v-w|^p$. The earth mover's distance $EMD_p$ error between two distributions X and Y is the minimum over all $\phi$ such that applying $\phi$ to X generates Y (i.e., $Pr[X=v]+\Sigma_{w \in V}\phi(v,w)=Pr[Y=v]$ for all v). This may appear complex, owing to the minimization over all possible transfer functions $\phi$. However, because of the structure of PDFs over a value domain V, the metric can be considerably simplified. Given two PDFs, X and Y, over $V=[1 \ldots V]$, the earth mover's distance $EMD_P$ can be computed in a single pass. The procedure operates by considering each index in turn. For example, starting from $i=1$, if the difference $Pr[X=i]-Pr[Y=i]$ is positive, the "mass" is shifted "moved" to index $i+1$, so that $Pr[X=i+1] \leftarrow Pr[X=i+1]+Pr[X=i]-Pr[Y=i]$, else the mass is shifted to $Pr[Y=i+1] \leftarrow Pr[Y=i+1]+Pr[Y=i]-Pr[X=i]$. $EMD_1(X,Y)$ is given by the total amount of probability mass moved (i.e., the sum of the $|Pr[X=i]-Pr[y=i]|$ at each step).

Equivalently, this process can be thought of as operating on "atoms" of probability (sometimes also referred to as an "unfolded histogram"). For simplicity, assume that each probability in the PDF can be written as an integer multiple of some small quantity $\Delta$. Then a PDF X can be written in terms of $1/\Delta$ such atoms as follows. Let $L_X[j]$ denote the position of the jth atom, so that $L_X[j] \le L_X[j+1]$ and $Pr[X=i]=\Delta|j:L[j]=i|$. Then:

$$EMD_p(X,Y) = \sum_{j=1}^{1/\Delta} \Delta |L_X[j] - L_Y[j]|^p. \qquad \text{Equation 45}$$

The correctness of Equation 45 can be seen by observing that any transfer function $\phi$ defines a bijection between atoms defining X and Y. If $L_X[1]$ is mapped to $L_Y[j]$, and $L_X[j']$ is mapped to $L_Y[1]$, then the cost of the transfer is no more than if $L_X[1]$ is mapped to $L_Y[1]$, and $L_X[j']$ is mapped to $L_Y[j]$. By repeating this argument for each index in turn, it is observed that the minimum error mapping is when $L_X[j]$ is mapped to $L_Y[j]$, yielding Equation 45.

Given the preceding characterization of the earth mover distance, the optimal unrestricted PDF to represent a collection of item PDFs under $EMD_p$ can be determined. If $\hat{X}$ is the representative PDF, then the error for the bucket in the B-bucket case can be written as:

$$\sum_{i=s}^{e} EMD_p(\hat{X}, X_i) = \Delta \sum_{j=1}^{1/\Delta} \sum_{i=s}^{e} |L_{\hat{X}}[j] - L_{X_i}[j]|^p. \quad \text{Equation 46}$$

This error can be minimized by placing each atom of $\hat{X}$ in turn to minimize $\Sigma_{i=s}^{e} |L_{\hat{X}}[j] - L_{X_i}[j]|^p$.

Turning to the $EMD_1$ case, the optimal choice is to set $L_{\hat{X}}[j] = \text{median}_{i \in b} L_{X_i}[j]$. This gives a valid PDF because the total probability mass remains 1, as there is a location for each atom of probability. Further, the atoms are placed in increasing order along the value domain, since $L_{X_i}[j] \leq L_{X_i}[j+1]$ for all i, j, and so $L_{\hat{X}}[j] \leq L_{\hat{X}}[j+1]$. The error associated with using this representative $\hat{X}$ is then:

$$\Delta \sum_{j=1}^{1/\Delta} \sum_{i=s}^{e} |L_{\hat{X}}[j] - L_{X_i}[j]| = \quad \text{Equation 47}$$

$$\Delta \sum_{j=1}^{1/\Delta} \left( \sum_{i=s}^{e} L_{X_i}[j] - 2I(i,j) L_{X_i}[j] \right)$$

where $I(i,j)$ is an indicator variable that is 1 if $L_{X_i}[j] < \text{median}_t L_{X_i}[j]$, and 0 otherwise. Equation 47 can be solved with the answers to multiple instances of the one-dimensional range-sum-median problem. For each atom, the sum of values below the median for the locations of the atom over the bucket b can be found. In the B-bucket case, the dynamic programming framework considers all possible buckets in order to choose B optimal bucket boundaries. After the $$O\left(\frac{N^2}{\Delta} \log N\right)$$

cost of determining $1/\Delta$ instances of the range-sum-median problem, the representative value error of any bucket can be found in $O(1/\Delta)$ time. Therefore, when all probabilities are multiples of $\Delta$, the optimal B-bucket probabilistic histogram under the $EMD_1$ metric can be found in time $$O\left(N^2\left(B + \frac{\log(N)}{\Delta}\right)\right).$$

For the T-term case, an example approach is to apply the dynamic programming within a bucket by choosing a single representative probability value for a range of atoms [a,b]. However, this results in placing all those atoms at a single location in the representative PDF and, thus, generates a representative PDF containing a small number of impulses at particular locations. While the resulting histogram is optimal from the space of all probabilistic histograms containing representative PDFs with a total of T impulses, it does not match the original requirements to find a T-term histogram.

Instead, because $EMD_1(X,Y) = \|F(X) - F(Y)\|_1$, the distance $EMD_1$ is equivalent to the $L_1$ distance between the cumulative probability distributions of X and Y, denoted by $F(X)$ and $F(Y)$ respectively. This follows from the previous analysis by allowing $\Delta$ to tend to 0. Note that the cumulative distribution of a PDF represented by a histogram with t terms on V is a non-decreasing t-piecewise linear function G that is (a) continuous in the sense that each consecutive pair of linear segments meet at a common point, and (b) normalized in the sense that $G(0)=0$ and $G(V)=1$. Hence, an example technique is based on determining such a function G that minimizes $\Sigma_i \|F(X_i) - G\|_1$. This can be done by straightforward modifications of the conventional approximation algorithm described by Aronov et al. in "Polyline Fitting of Planar Points under Min-Sum Criteria," Intl. J. Comput. Geometry Appl., 16(2-3), 97-116 (2006), to ensure that f is normalized and non-decreasing. However, since the cost is quartic in the number of points (i.e. $O(((s-e+1)V)^4)$), this approach may be impractical for large instances.

While an example manner of implementing the example probabilistic histogram generator 115 of FIG. 1 has been illustrated in FIG. 3, one or more of the elements, processes and/or devices illustrated in FIG. 3 may be combined, divided, re-arranged, omitted, eliminated and/or implemented in any other way. Further, the example representative error processor 305, the example bucket error processor 310, the example histogram error processor 315, the example probabilistic histogram selector 320 and/or, more generally, the example probabilistic histogram generator 115 of FIG. 3 may be implemented by hardware, software, firmware and/or any combination of hardware, software and/or firmware. Thus, for example, any of the example representative error processor 305, the example bucket error processor 310, the example histogram error processor 315, the example probabilistic histogram selector 320 and/or, more generally, the example probabilistic histogram generator 115 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the appended claims are read to cover a purely software and/or firmware implementation, at least one of the example probabilistic histogram generator 115, the example representative error processor 305, the example bucket error processor 310, the example histogram error processor 315 and/or the example probabilistic histogram selector 320 are hereby expressly defined to include a tangible medium such as a memory, digital versatile disk (DVD), compact disk (CD), etc., storing such software and/or firmware. Further still, the example probabilistic histogram generator 115 of FIG. 3 may include one or more elements, processes and/or devices in addition to, or instead of, those illustrated in FIG. 3, and/or may include more than one of any or all of the illustrated elements, processes and devices.

Returning to FIG. 1, the illustrated example probabilistic database server 105 includes a probabilistic histogram post-processor 150, as described above, to process one or more probabilistic histograms generated by the probabilistic histogram generator 115 in response to one or more queries, such as a selection query or a join query, received from the example interface terminal 140 via the example query interface 145. A probabilistic histogram, regardless of error and/or distance metric used in its generation, can be used to approximate a variety of queries. For example, extracting basic statistics of the probabilistic data, such as expected values, from the probabilistic histogram is straightforward. The following describes how probabilistic histograms can be employed in more complex queries, such as selection and join queries. A beneficial property is that many of these operations are closed for probabilistic histograms in that applying a query operation generates a new output probabilistic histogram having a space cost S that is closely related to the original cost of the input probabilistic histogram(s).

A selection query (e.g., received via query interface 145) on the item domain identifies, or selects, a subset of the probabilistic data tuples $C \subset U$ based on some specified selection criteria. In an example implementation, the probabilistic histogram post-processor 150 determines a probabilistic histogram for just these selected tuples by projecting the original probabilistic histogram for the entire data set U onto this support set C. For example, for a range selection over U, the result of the projection is the portion of the original probabilistic histogram having only the buckets containing the data tuples in the support set C.

Selection can also be on the value domain V in which data tuples having a specified value v are to be selected. In such a selection query, the resulting probabilistic histogram summarizing the data tuples meeting the selection criterion (e.g., having a value of v) is such that each bucket's representative PDF is a conditional distribution conditioned on the predicate probability P(v) that the value v occurs in the particular bucket. That is, given an original representative PDF $\hat{X}(b)$, the new conditional representative PDF $\hat{X}(b,P)$ for bucket b is determined by the probabilistic histogram post-processor 150 to be:

$$Pr[\hat{X}(b, P) = v \mid P(v)] = \frac{Pr[\hat{X}(b) = v]}{\sum_{v \mid P(v)} Pr[\hat{X}(b) = v]},$$  Equation 48 and zero otherwise (i.e., $Pr[\hat{X}(b,P)=v \mid \neg P(v)]=0$). Moreover, when $\hat{X}(b)$ is given by some small number of terms t, and P corresponds to a range predicate, the resulting conditional representative PDF is also represented by at most t+2 terms (i.e., at most two new terms may be needed at the extreme ends of the distribution).

When combined with an aggregation, the probabilistic histogram post-processor 150 can determine statistical information regarding a selection query using post-processed probabilistic histograms. For example, the expected number of distinct tuples selected is readily computed from the buckets. The expected number of tuples passing a predicate P is given by $$\sum_{k=1}^{B} (e_k - s_k + 1) \Sigma_{v \in V \mid P(v)} Pr[\hat{X}(b_k) = v],$$

where $\hat{X}(b_k)$ is the PDF representing the kth bucket, $b_k$. Also, the distribution of the number of tuples selected has a simple form. Let $P(\hat{X}(b))$ be shorthand for $\Sigma_{v \in V \mid P(v)} Pr[\hat{X}(b)=v]$. Then, for a bucket b, the distribution of the number of distinct tuples selected by P is $Bin((e-s+1), P(\hat{X}(b)))$, which is the binomial distribution with $n=(e-s+1)$ and $p=P(\hat{X}(b))$ (because each item is treated as independent). Consequently, the distribution over the entire histogram is $$\sum_{k=1}^{B} Bin((e-s+1), P(\hat{X}(b))).$$

A join query (e.g., received via query interface 145) combines probabilistic data tuples from two different data sets based on specified join criteria. In response to a join query, such as an equijoin on the item domain U, the probabilistic histogram post-processor 150 combines the two original probabilistic histograms representing the probabilistic data in each of the two probabilistic data sets. However, it is not necessary that the two original probabilistic histograms share the same bucket boundaries. Given two histograms with $B_1$ and $B_2$ buckets respectively, together this defines a partition of U with at most $B_1+B_2-1$ non-overlapping ranges. There is a unique bucket from each original probabilistic histogram, say $b^1$ and $b^2$, which covers all data items in each of a given range. These two buckets define a distribution over items in the range which, by assuming independence between the two probabilistic data sets, is a product distribution, which can be written as: $Pr[X=(v_1,v_2)]=Pr[\hat{X}(b^1)=v_1]Pr[\hat{X}(b^2)=v_2]$.

Assuming for simplicity that the join is an equijoin on V (other join types are similar), then the join tuple(s) within the overlap of buckets $b_1$ and $b_2$ can be represented by an output representative PDF $\hat{X}(b_1,b_2)$ determined by the probabilistic histogram post-processor 150 by multiplying the input probabilistic histograms, i.e.:

$$Pr[\hat{X}(b_1,b_2)=v]=Pr[\hat{X}(b_1)=v]Pr[\hat{X}(b_2)=v].$$  Equation 49

If buckets $b_1$ and $b_2$ are represented by $t_1$ and $t_2$ terms respectively, the resulting representative PDF for the combined buckets can be represented by at most $t_1+t_2-1$ terms. Thus, probabilistic histograms determined by the probabilistic histogram post-processor 150 are closed under join operations such as these. From the resulting histograms, the probabilistic histogram post-processor 150 can determine statistical information regarding join queries, such as expected values, tail bounds on distributions, etc.

Flowcharts representative of example machine readable instructions that may be executed to implement the example probabilistic database server 105, the example probabilistic database 110, the example probabilistic histogram generator 115, the example data interface 135, the example query interface 145, the example probabilistic histogram post-processor unit 150, the example representative error processor 305, the example bucket error processor 310, the example histogram error processor 315 and/or the example probabilistic histogram selector 320 are shown in FIGS. 4-7. In these examples, the machine readable instructions represented by each flowchart may comprise one or more programs for execution by: (a) a processor, such as the processor 1412 shown in the example processing system 1400 discussed below in connection with FIG. 14, (b) a controller, and/or (c) any other suitable device. The one or more programs may be embodied in software stored on a tangible medium such as, for example, a flash memory, a CD-ROM, a floppy disk, a hard drive, a DVD, or a memory associated with the processor 1412, but the entire program or programs and/or portions thereof could alternatively be executed by a device other than the processor 1412 and/or embodied in firmware or dedicated hardware (e.g., implemented by an application specific integrated circuit (ASIC), a programmable logic device (PLD), a field programmable logic device (FPLD), discrete logic, etc.).

For example, any or all of the example probabilistic database server 105, the example probabilistic database 110, the example probabilistic histogram generator 115, the example data interface 135, the example query interface 145, the example probabilistic histogram post-processor unit 150, the example representative error processor 305, the example bucket error processor 310, the example histogram error processor 315 and/or the example probabilistic histogram selector 320 could be implemented by any combination of software, hardware, and/or firmware. Also, some or all of the machine readable instructions represented by the flowchart of FIGS. 4-7 may be implemented manually. Further, although the example machine readable instructions are described with reference to the flowcharts illustrated in FIGS. 4-7, many other techniques for implementing the example methods and apparatus described herein may alternatively be used. For example, with reference to the flowcharts illustrated in FIGS. 4-7, the order of execution of the blocks may be changed, and/or some of the blocks described may be changed, eliminated, combined and/or subdivided into multiple blocks.

First example machine readable instructions 400 that may be executed to implement the probabilistic histogram generation in the probabilistic database server 105 of FIG. 1 are represented by the flowchart shown in FIG. 4. The example machine readable instructions 400 may be executed at predetermined intervals (e.g., to periodically update probabilistic histogram of probabilistic data maintained by the probabilistic database 110), based on an occurrence of a predetermined event (e.g., such as when probabilistic data is added to and/or deleted from the probabilistic database 110, when a query is received via the query interface 145, etc.), as a background process, etc., or any combination thereof.

In the illustrated example of FIG. 4, the machine readable instructions 400 begin execution at block 405 at which the probabilistic histogram generator 115 included in the probabilistic database server 105 obtains a set of probabilistic data items characterized by a respective set of individual item PDFs from the probabilistic database 110 included in the probabilistic database server 105. For example, and as described above, the probabilistic database 110 can store an ordered set of probabilistic data items indexed over an ordered domain $U=\{1\ldots N\}$, with the $i^{th}$ data item capable of having an attribute data value selected from an attribute value domain V according to an individual item PDF $X_i$. In such an example, at block 405, the probabilistic histogram generator 115 obtains the ordered set of probabilistic items i and their respective set of individual item PDFs $X_i$ characterizing the probabilities that each probabilistic item i can have the one of the different possible attribute values from the attribute value domain V.

Next, at block 410 the probabilistic histogram generator 115 obtains a specified number of buckets B to be used to generate a probabilistic histogram representing the probabilistic data obtained at block 405. As such, the example machine readable instructions 400 are to generate a B-bucket probabilistic histogram, as described above. In an example implementation, the specified number of buckets B is input at the interface terminal 140 and provided to the probabilistic database server 105 via the data interface 135.

Next, at block 415 the probabilistic histogram generator 115 partitions the set of ordered probabilistic data items i obtained at block 405 into the number of buckets B obtained at block 410. For example, at block 415 the probabilistic histogram generator 115 partitions the set of ordered probabilistic data items i into B buckets over the ordered domain $U=\{1\ldots N\}$, with each probabilistic histogram bucket $b=(s, e)$ have a start point s and end point e, and covering the $|b|=e-s+1$ probabilistic data items with domain index values between, and included, the start point s and end point e.

Next, at block 420 the probabilistic histogram generator 115 determines a representative PDF for each of the buckets determined at block 415. In an example implementation, at block 420 the probabilistic histogram generator 115 determines, for each bucket b, a representative PDF $\hat{X}(b)$ over the set of possible attribute values V that summarizes the individual item PDFs $X_s, X_{s+1}, \ldots, X_e$ for the probabilistic data items inside the bucket b. In other words, probabilistic histogram generator 115 determines, for each bucket b, a representative PDF $\hat{X}(b)$ that characterizes the probabilities that the subset of probabilistic data items covered by the bucket b can take on each of the different possible attribute values V. As described in greater detail above, the probabilistic histogram generator 115 can determine the buckets at block 415 and the respective representative PDFs for the buckets at block 420 to minimize a bucket error (e.g., given by Equation 1) based on one of many different distance metrics (e.g., such as the distance metrics given by Equation 4 through Equation 8) specifying the error between each representative PDF and the set of individual item PDFs it is to summarize, and to also minimize a specified overall probabilistic histogram error (e.g., such as the overall histogram errors given by Equation 2 and Equation 3) that represents an aggregation of the bucket errors over all of the buckets included in the overall probabilistic histogram. Then, after processing at block 420 completes, execution of the machine readable instructions 400 ends.

Second example machine readable instructions 500 that may be executed to implement the probabilistic histogram generation in the probabilistic database server 105 of FIG. 1 are represented by the flowchart shown in FIG. 5. The example machine readable instructions 500 may be executed at predetermined intervals (e.g., to periodically update probabilistic histogram of probabilistic data maintained by the probabilistic database 110), based on an occurrence of a predetermined event (e.g., such as when probabilistic data is added to and/or deleted from the probabilistic database 110, when a query is received via the query interface 145, etc.), as a background process, etc., or any combination thereof.

In the illustrated example of FIG. 5, the machine readable instructions 500 begin execution at block 505 at which the probabilistic histogram generator 115 included in the probabilistic database server 105 obtains a set of probabilistic data items characterized by a respective set of individual item PDFs from the probabilistic database 110 included in the probabilistic database server 105. For example, and as described above, the probabilistic database 110 can store an ordered set of probabilistic data items indexed over an ordered domain $U=\{1\ldots N\}$, with the $i^{th}$ data item capable of having an attribute data value selected from an attribute value domain V according to a individual item PDF $X_i$. In such an example, at block 505, the probabilistic histogram generator 115 obtains the ordered set of probabilistic items i and their respective set of individual item PDFs $X_i$ characterizing the probabilities that each probabilistic item i can have the one of the different possible attribute values from the attribute value domain V.

Next, at block 510 the probabilistic histogram generator 115 obtains a specified number of piece-wise constant terms T to be used to generate a probabilistic histogram representing the probabilistic data obtained at block 505. As such, the example machine readable instructions 400 are to generate a T-term probabilistic histogram over some number of buckets, as described above. In an example implementation, the specified number of terms T is input at the interface terminal 140 and provided to the probabilistic database server 105 via the data interface 135.

Next, at block 515 the probabilistic histogram generator 115 partitions the set of ordered probabilistic data items i obtained at block 505 into a set of buckets and determines a representative PDF for each bucket such that the number of terms T specified at block 510 to be used to generate the probabilistic histogram is not exceeded. For example, at block 515 the probabilistic histogram generator 115 partitions the set of ordered probabilistic data items i into some number of buckets over the ordered domain $U=\{1 \ldots N\}$, with each probabilistic histogram bucket $b=(s,e)$ have a start point s and end point e, and covering the $|b|=e-s+1$ probabilistic data items with domain index values between, and including, the start point s and end point e. At block 515, the probabilistic histogram generator 115 also determines, for each bucket b, a representative PDF $\hat{X}(b)$ over the set of possible attribute values V that summarizes the individual item PDFs $X_s$, $X_{s+1}, \ldots, X_e$ for the probabilistic data items inside the bucket b. As described above, in the T-term implementation, the probabilistic histogram generator 115 determines the buckets and respective representative PDFs to minimize an overall histogram error (e.g., such as the histogram errors given by Equation 2 and Equation 3) based on combining bucket errors (e.g., given by Equation 1), which are based on one of many possible distance metrics (e.g., such as the distance metrics given by Equation 4 through Equation 8), such that no more that T terms are used to represent all of the representative PDFs for all of the buckets included in the overall probabilistic histogram. Then, after processing at block 515 completes, execution of the machine readable instructions 500 ends.

Figure 6:
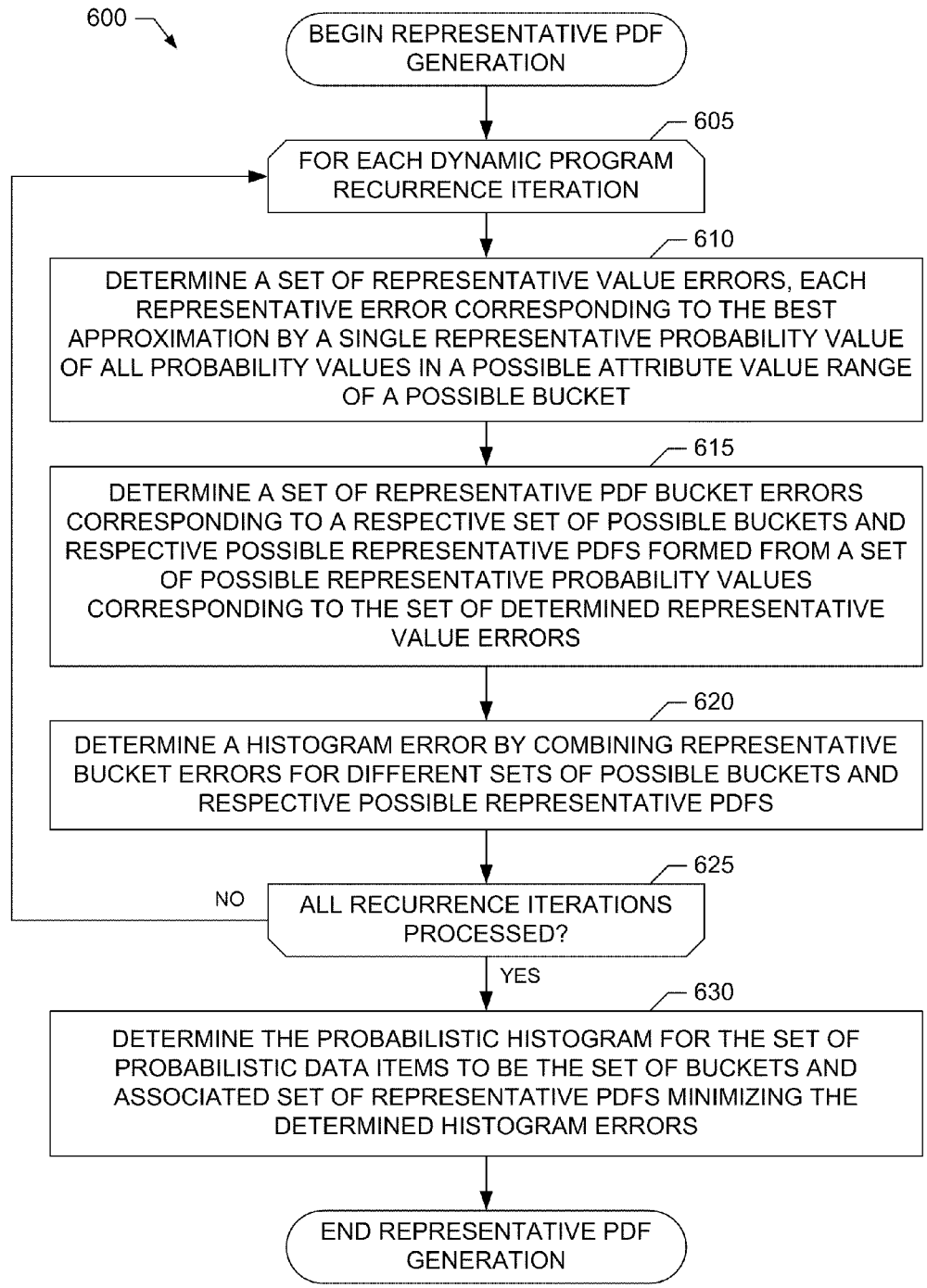
FIG. 6 is a flowchart representative of example machine readable instructions that may be executed to implement the probabilistic histogram generators of FIGS. 1 and/or 3.

Example machine readable instructions 600 that may be executed to implement the probabilistic histogram generator 115 of FIGS. 1 and/or 3 are represented by the flowchart shown in FIG. 6. The example machine readable instructions 600 may be executed at predetermined intervals (e.g., to periodically update probabilistic histogram of probabilistic data maintained by the probabilistic database 110), based on an occurrence of a predetermined event (e.g., such as when probabilistic data is added to and/or deleted from the probabilistic database 110, when a query is received via the query interface 145, etc.), as a background process, etc., or any combination thereof.

In the illustrated example of FIG. 6, and with reference to the probabilistic histogram generator 115 of FIG. 3, the example machine readable instructions 600 begin execution at block 605 at which the probabilistic histogram generator 115 initiates a dynamic programming procedure to determine a probabilistic histogram for a set of probabilistic data stored in the probabilistic database 110. For each dynamic program iteration (block 605), at block 610 the representative error processor 305 included in the probabilistic histogram generator 115 determines a set of representative value errors, with each representative value error corresponding to the best approximation by a single representative probability value of all probability values characterizing a possible attribute value range of a possible bucket of the probabilistic histogram. For example, at block 610, the representative error processor 305 can use any of the distance metric techniques described above to determine a particular representative value error, ValErr(b, v,w), corresponding to a possible attribute data value range $r=(v,w)$ in a particular bucket b. As described above, ValErr (b,v,w) represents the error of approximating all the individual item PDF probability values representing the probabilities that the subset of data items in the bucket b can take on the attribute data value range $r=(v,w)$ (where $v,w \in V$) by a single (e.g., optimal), constant representative probability value $\bar{p}$ (which is one of the piece-wise constant representative probability values making up the representative PDF in the bucket b).

Next, at block 615 the bucket error processor 310 included in the probabilistic histogram generator 115 determines a set of representative PDF bucket errors for a respective set of possible buckets having respective possible representative PDFs formed from a set of possible representative probability values corresponding to the set of representative value errors determined at block 610. For example, at block 615, the bucket error processor 310 can use Equation 9 to determine the representative PDF error (or bucket error) $B-Opt^b[v,T]$ as the optimal PDF approximation error for a portion of a possible representative PDF approximating the attribute data value range in a bucket b up to the value $v \in V$ using at most T piece-wise constant segments. The T piece-wise constant segments correspond to the constant representative probability values having the representative value errors determined at block 610.

Next, at block 620 the histogram error processor 315 included in the probabilistic histogram generator 115 determines a histogram error by combining the representative bucket errors determined at block 615 for different sets of possible buckets and respective possible representative PDFs. For example, at block 620 the histogram error processor 315 can use Equation 10 to determine the histogram error, H–Opt [m,T], as the optimal error for a possible probabilistic histogram having a set of possible (e.g., optimal) buckets and respective possible (e.g., optimal) representative PDFs approximating up to the ordered data domain value $m \in U$ and for a total space budget of T terms. The set of possible (e.g., optimal) buckets and respective possible (e.g., optimal) representative PDFs correspond to the possible buckets and spective possible representative PDFs having the representative bucket errors determined at block 615.

Then, after all dynamic program recurrence iterations are processed (block 625), at block 630 the probabilistic histogram selector 320 included in the probabilistic histogram generator 115 determines the probabilistic histogram for the set of probabilistic data to be the set of buckets and associated set of representative PDFs having piece-wise constant segments minimizing the histogram errors determined at block 620. After the probabilistic histogram is determined at block 630, execution of the machine readable instructions 600 ends.

Figure 7:
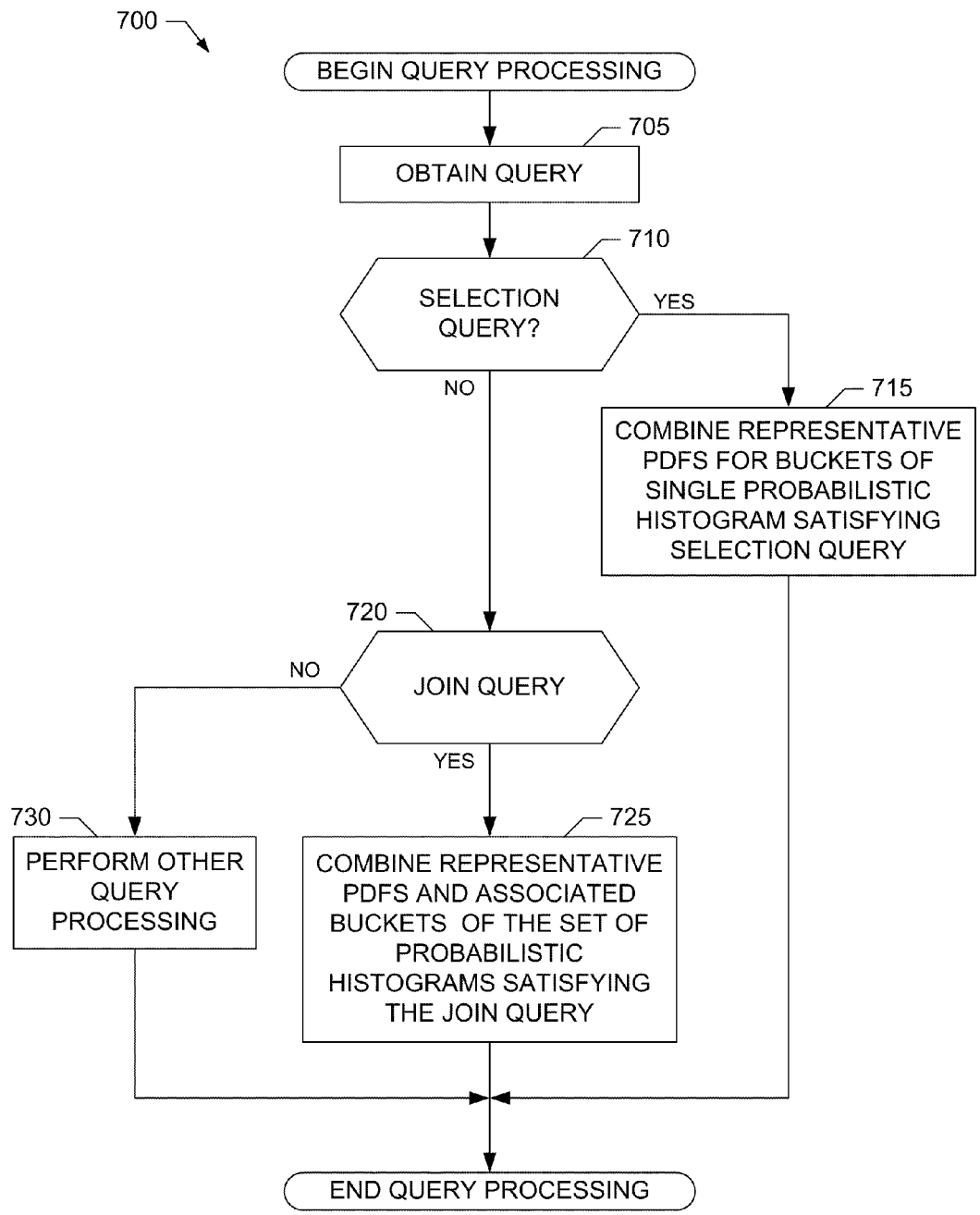
FIG. 7 is a flowchart representative of example machine readable instructions that may be executed to implement query processing in the probabilistic database server of FIG. 1.
Figure 8:
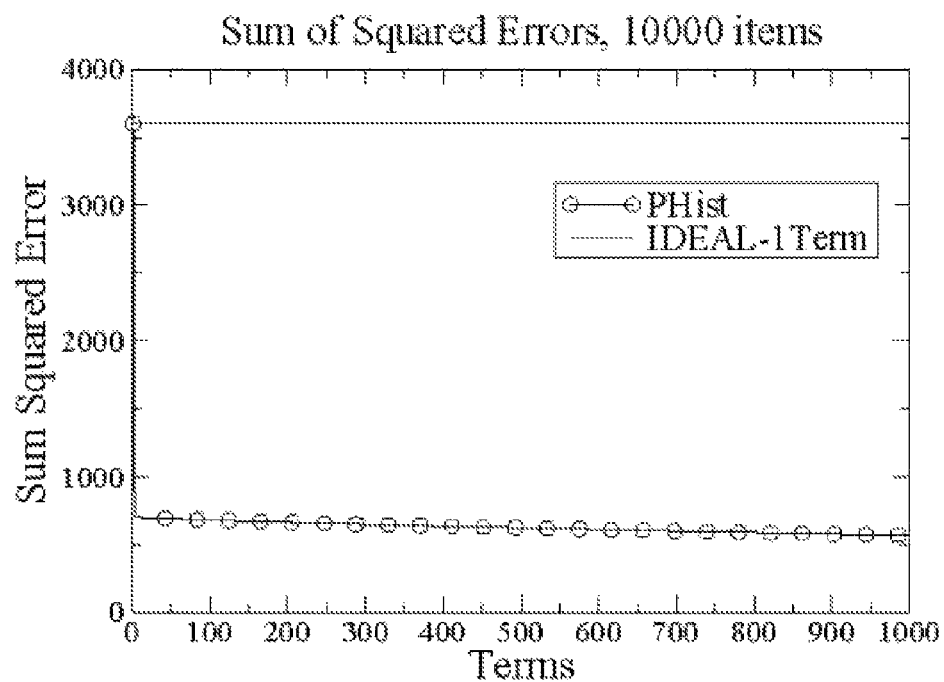
FIGS. 8-13 illustrate example performance results for the probabilistic histogram generators of FIGS. 1 and/or 3.
Figure 9:
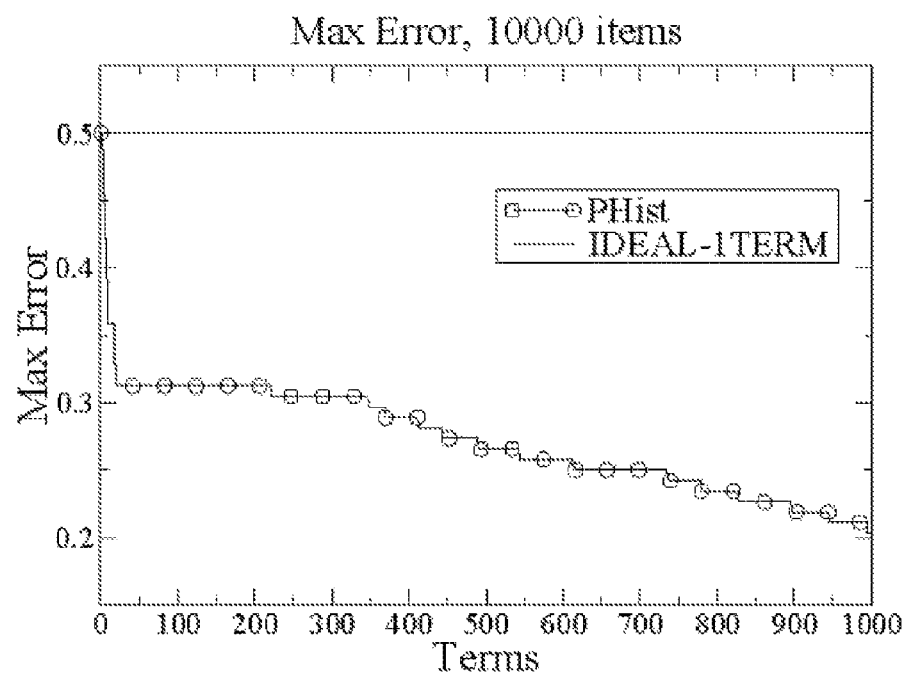
Figure 10:
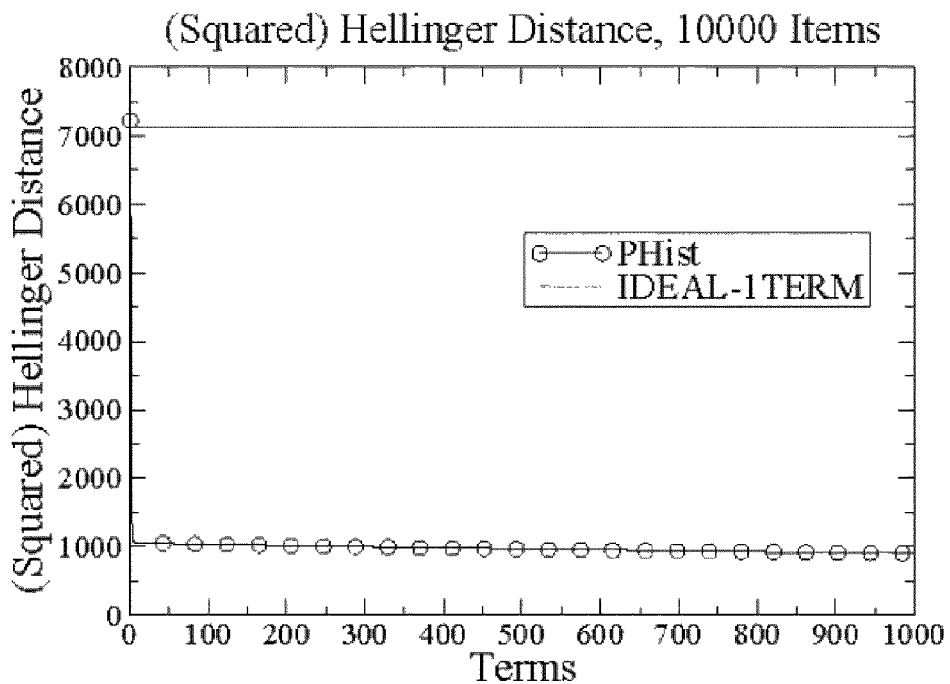

Example machine readable instructions 700 that may be executed to implement query processing in the probabilistic database server 105 of FIG. 1 are represented by the flowchart shown in FIG. 7. The example machine readable instructions 700 may be executed at predetermined intervals (e.g., to poll for receipt of queries), based on an occurrence of a predetermined event (e.g., such as when a query is received via the query interface 145, etc.), as a background process, etc., or any combination thereof.

The example machine readable instructions 700 begin execution at block 705 at which the query interface 145 included in the probabilistic database server 105 obtains a database query from the interface terminal 140. Next, at block 710 the query interface 145 determines whether the query obtained at block 705 corresponds to a selection query of the probabilistic database 110 included in the probabilistic database server 105. If the query corresponds to a selection query (block 710), then at block 715 the probabilistic histogram post-processor 150 included in the probabilistic database server 105 processes an existing probabilistic histogram (e.g., previously generated by the probabilistic histogram generator 115 for the probabilistic data stored in the probabilistic database 110) to determine a new, conditional probabilistic histogram representative of the subset of probabilistic data items meeting the selection criteria. For example, if the selection query is on the value domain V (e.g., to select data tuples having a specified value v), then at block 715 the probabilistic histogram post-processor 150 may determine the new conditional probabilistic histogram using Equation 48 to determine a new, conditional representative PDF for each histogram bucket. After processing at block 715 completes, execution of the machine readable instructions 700 ends.

However, if the query does not correspond to a selection query (block 710), then at block 720 the query interface 145 determines whether the query obtained at block 705 corresponds to a join query of the probabilistic database 110. If the query corresponds to a join query (block 720), then at block 725 the probabilistic histogram post-processor 150 combines two original probabilistic histograms (e.g., previously generated by the probabilistic histogram generator 115 for two probabilistic data sets stored in the probabilistic database 110) representing the probabilistic data in each of two probabilistic data sets that are the subject of the join query. For example, at block 720 the probabilistic histogram post-processor 150 may determine a new output probabilistic histogram corresponding to the join of two probabilistic data sets by using Equation 49 to combine representative PDFs from each of the input probabilistic histogram to determine representative PDFs for each bucket of the output probabilistic histogram. After processing at block 725 completes, execution of the machine readable instructions 700 ends.

However, if the query does not correspond to a join query (block 720), then at block 730 the query interface 145 causes the probabilistic database server 105 to perform any other appropriate query processing. Execution of the machine readable instructions 700 then ends.

Example performance results for the probabilistic histogram generator 115 of FIGS. 1 and 3 are illustrated in FIGS. 8-13. The illustrated performance results depict the quality and scalability of the probabilistic histograms (denoted as PHist in the figures) that can be generated by the probabilistic histogram generator 115. To generate the illustrated performance results, examples of the probabilistic histogram generation techniques described herein were implemented in the programming language C on a server equipped with four (4) Intel Xeon central processing units (CPUs) clocked at 1.6 GHz and having 8 gigabytes (GB) of random access memory (RAM). Each experiment was run on a single CPU.

The experiments used a mixture of real and synthetic data sets. The real data set came from the University of Washington's MystiQ project, which includes approximately 127,000 tuples describing 27,700 distinct items. That data set corresponds to links between a movie database and an e-commerce inventory, so the tuples for each item define the distribution of the number of expected matches formed by combining individual tuple linkage probabilities into PDFs. In this data set the maximum frequency of any item was 10, thus requiring V=11 frequency probabilities for each item (i.e., the probability that the frequency of each item is 0, 1, ..., 10). Experiments were also performed on synthetic data generated using an extension to Cornell University's TPC-H generator. The results on the synthetic data were similar to those for the real data set and so are omitted for brevity.

The performance of the example probabilistic histogram generation techniques described herein are compared against a technique, referred to as "IDEAL-1Term," that uses a distinct bucket to represent each item of the data, but limits the representation within each bucket to a single term. Essentially, the IDEAL-1Term technique corresponds to the optimal conventional-style histogram (e.g., using a single term per bucket) that can be achieved if no additional space constraints are imposed. In other words, IDEAL-1Term provides a bound on the best performance that can be obtained by any conventional histogram which uses a single value to represent a bucket. The IDEAL-1Term uses the expected frequency $E[f_i]$ of each item i to be the representative value of the bucket containing the single item i. As demonstrated in the figures, the error for the IDEAL-1Term algorithm significantly exceeds that obtained by the example probabilistic histogram generation techniques described herein.

Figure 11:
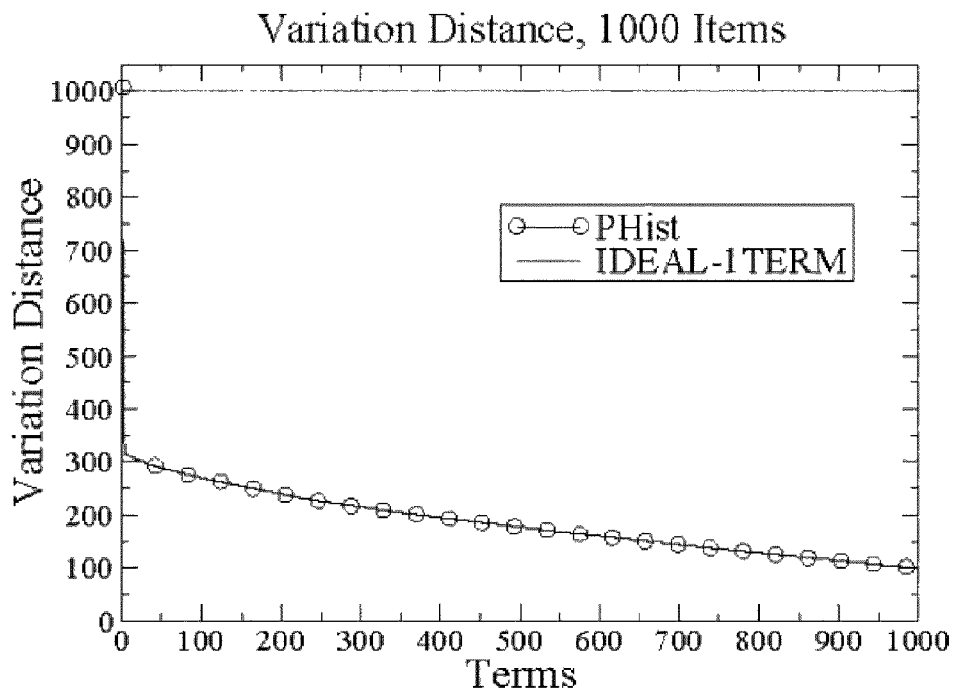

Probabilistic histograms (PHists) were generated using different distance metrics over N items using T terms, with FIGS. 8-13 illustrating the errors and costs of the PHists relative to distance metric. The quality of the generated probabilistic histograms (PHists) is shown in FIGS. 8-11 for probabilistic histograms (PHists) implemented to minimize the following distance metrics: sum of squared errors (FIG. 8), the max-error metric (FIG. 9), the (squared) Hellinger distance (FIG. 10) and the variation distance (FIG. 11). The sum of squared errors, the max-error metric and the (squared) Hellinger distance techniques were applied to the same $N=10^4$ distinct data items, whereas the variation distance was applied to the first $N=10^3$ distinct data items, as the computational cost for this technique is higher. The general trend for all probabilistic histogram generation techniques is similar: for the error metrics considered, the probabilistic histogram approach of representing buckets PDFs with a representative PDF is more accurate than picking a single value, even if (as in the IDEAL-1Term case) the single value technique is allowed to treat each PDF separately. The IDEAL-1Term technique can never achieve zero error, even though it uses N buckets, since each bucket is limited to contain a single term. Comparing the probabilistic histograms (PHist)) with the IDEAL-1Term technique, the errors of the probabilistic histogram techniques are significantly lower (even when using just a few terms) than those of IDEAL-1Term, even though the latter uses much more space (N buckets). This is due to the more intelligent partitioning of the domain space performed by the probabilistic histogram techniques. The two techniques have similar errors when PHist is restricted to representative PDFs having a single term. This clearly demonstrates the need for using representative PDFs having multiple terms in order to better approximate this probabilistic data set.

For sum squared error and the similar Hellinger distance (FIGS. 8 and 10, respectively), the error decreases gradually as more terms are allowed. This suggests that there is relatively little benefit in using a large number of representative probability value terms for this data set, as around 100 terms seems to capture the behavior almost as well as 1000. (Note that with N=10000 and V=11, it would take T=110000 terms to fully represent the input data with zero error). For the max-error case and the Variation Distance (FIGS. 9 and 11, respectively), there is a clearer benefit to adding more terms, with a more pronounced decrease of error.

Figure 12:
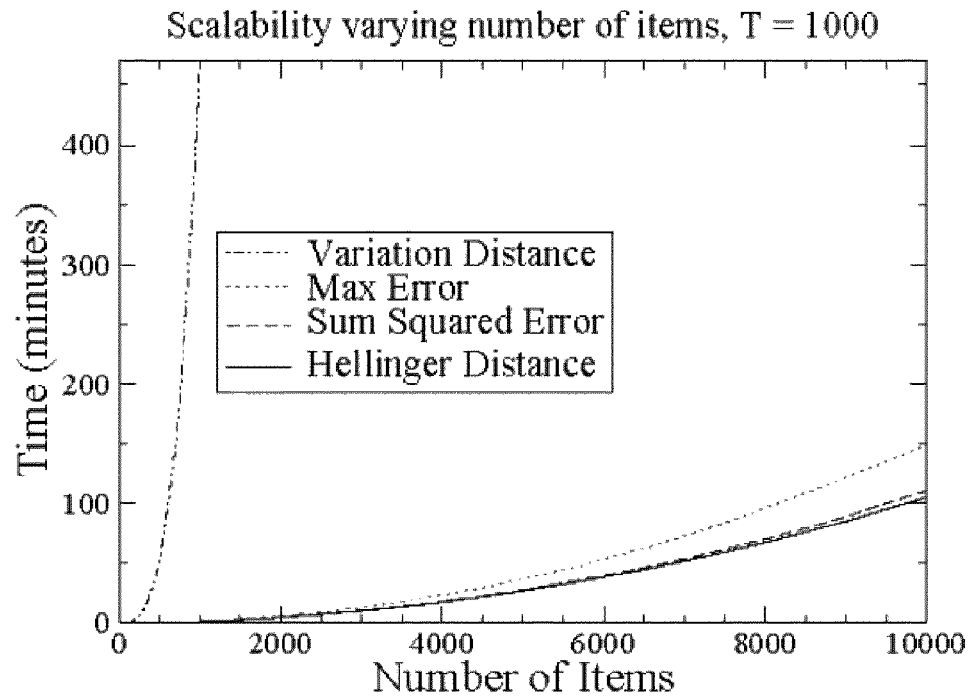
Figure 13:
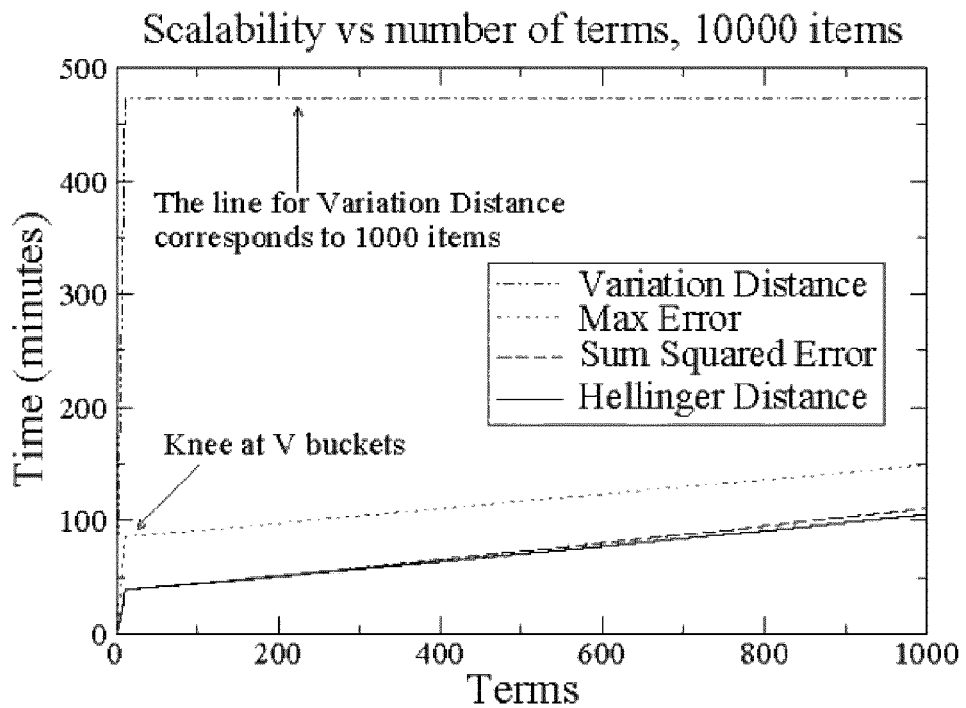

FIGS. 12-13 illustrate the time cost of the example probabilistic histogram generation techniques described herein for the four distance metrics examined in FIGS. 8-11. In particular, FIGS. 12-13 illustrate the time taken as the number of items (N) increases, and reveal a quadratic relationship between the running time and N for the sum of squared errors, the Hellinger distance and the max-error cases. This is in line with the asymptotic costs for these methods as described above, in which the leading term is $N^2$. The costs for the sum squared error and the Hellinger distance implementations are quite close, mainly due to the similarity in the form of their respective implementations. For the max-error case, the cost is slightly higher, and grows slightly faster. This is due in part to the fact that the examined example implementation used a simpler version of the max-error implementation technique to determine the optimal bucket representative, which adds a logarithmic factor to the running time complexity of approximating each bucket. Thus, it is expected that the running time of a more elaborate max-error implementation would more closely match the running time for the Hellinger distance and the sum of squared errors implementations. From FIGS. 12-13 it is also clear that minimizing the variation distance results in high running times, which is approximately cubic with N in the examined implementation.

FIGS. 12-13 also show a clear linear trend as the number of terms increases, as predicted by the analysis provided above, but there is also a sharp knee in the performance curves for a small number of terms. This knee occurs where T=V, and is explained by the fact that, up to this point, the probabilistic histogram generation techniques have to explore increasingly many combinations of ways to choose T<V terms to represent any bucket. But it makes no sense to assign more than 1 term for each of the V possible frequency values within a bucket. The error of a bucket using more than V terms is identical to the corresponding error when using exactly V terms. As mentioned in the above discussion of the dynamic programming framework, for values of T>V, and for any assignment of T terms to a possible bucket, the optimal T-term representative PDF of the respective bucket is guaranteed to have been computed in a prior iteration of the dynamic programming framework. As shown in FIGS. 12-13, for T≦V, the costs for the different distance metric probabilistic histogram techniques considered grows in proportion to $T^2$, whereas for T>V, the different techniques grow proportional to T, resulting in the linear growth pattern observed for larger values of T.

Figure 14:
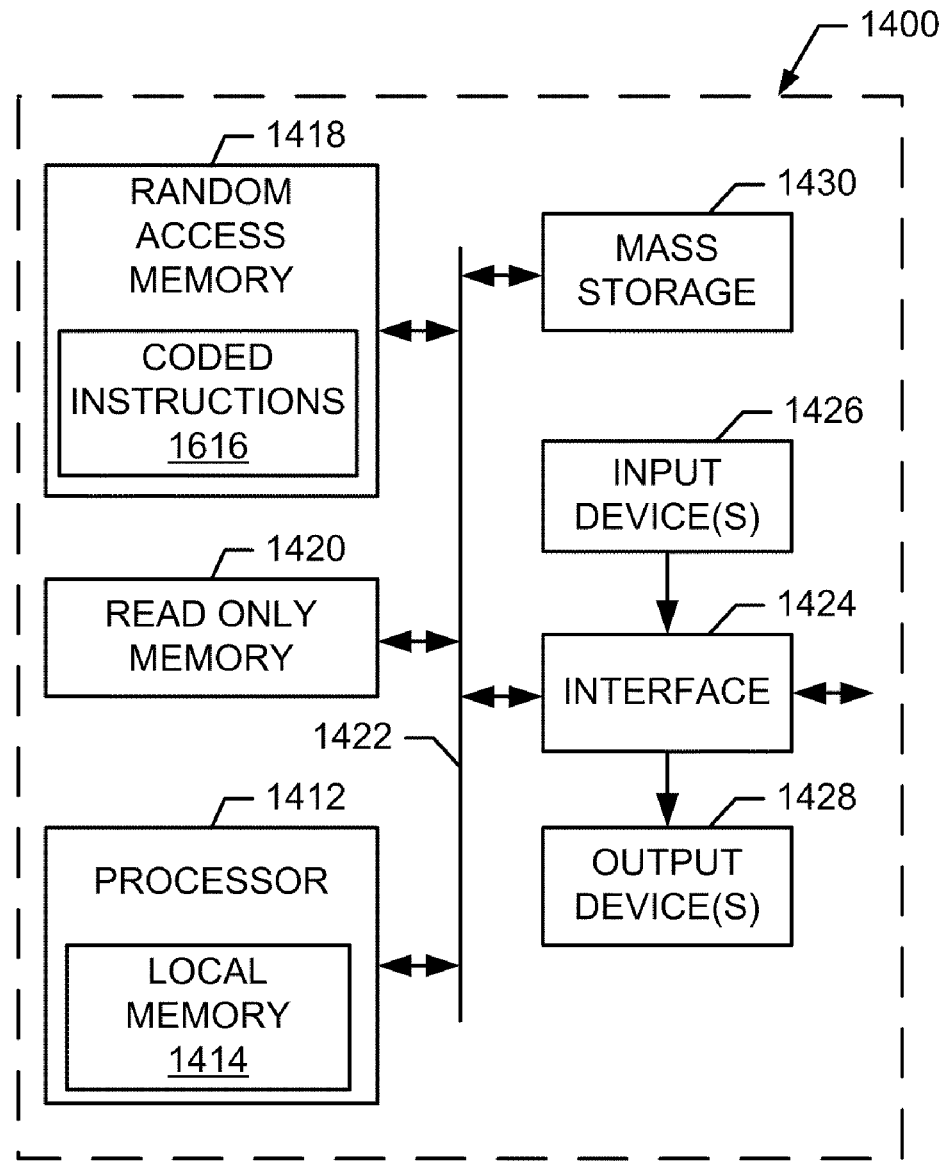
FIG. 14 is a block diagram of an example processing system that may execute the example machine readable instructions of FIGS. 4-7 to implement the probabilistic database server of FIG. 1 and/or the probabilistic histogram generators of FIGS. 1 and/or 3.

FIG. 14 is a block diagram of an example processing system 1400 capable of implementing the apparatus and methods disclosed herein. The processing system 1400 can be, for example, a server, a personal computer, a personal digital assistant (PDA), an Internet appliance, a DVD player, a CD player, a digital video recorder, a personal video recorder, a set top box, or any other type of computing device. In an example implementation, the processing system 1400 implements the probabilistic database server 105.

The system 1400 of the instant example includes a processor 1412 such as a general purpose programmable processor. The processor 1412 includes a local memory 1414, and executes coded instructions 1416 present in the local memory 1414 and/or in another memory device. The processor 1412 may execute, among other things, the machine readable instructions represented in FIGS. 13-18. The processor 1412 may be any type of processing unit, such as one or more microprocessors from the Intel® Centrino® family of microprocessors, the Intel® Pentium® family of microprocessors, the Intel® Itanium® family of microprocessors, and/or the Intel XScale® family of processors. Of course, other processors from other families are also appropriate.

The processor 1412 is in communication with a main memory including a volatile memory 1418 and a non-volatile memory 1420 via a bus 1422. The volatile memory 1418 may be implemented by Static Random Access Memory (SRAM), Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1420 may be implemented by flash memory and/or any other desired type of memory device. Access to the main memory 1418, 1420 is typically controlled by a memory controller (not shown).

The processing system 1400 also includes an interface circuit 1424. The interface circuit 1424 may be implemented by any type of interface standard, such as an Ethernet interface, a universal serial bus (USB), and/or a third generation input/output (3GIO) interface.

One or more input devices 1426 are connected to the interface circuit 1424. The input device(s) 1426 permit a user to enter data and commands into the processor 1412. The input device(s) can be implemented by, for example, a keyboard, a mouse, a touchscreen, a track-pad, a trackball, an isopoint and/or a voice recognition system.

One or more output devices 1428 are also connected to the interface circuit 1424. The output devices 1428 can be implemented, for example, by display devices (e.g., a liquid crystal display, a cathode ray tube display (CRT)), by a printer and/or by speakers. The interface circuit 1424, thus, typically includes a graphics driver card.

The interface circuit 1424 also includes a communication device such as a modem or network interface card to facilitate exchange of data with external computers via a network (e.g., an Ethernet connection, a digital subscriber line (DSL), a telephone line, coaxial cable, a cellular telephone system, etc.).

The processing system 1400 also includes one or more mass storage devices 1430 for storing software and data. Examples of such mass storage devices 1430 include floppy disk drives, hard drive disks, compact disk drives and digital versatile disk (DVD) drives. The mass storage device 1430 may implement data storage for the probabilistic database 110 and/or the probabilistic histogram generator 115. Alternatively, the volatile memory 1418 may implement data storage for the probabilistic database 110 and/or the probabilistic histogram generator 115.

At least some of the above described example methods and/or apparatus are implemented by one or more software and/or firmware programs running on a computer processor. However, dedicated hardware implementations including, but not limited to, application specific integrated circuits, programmable logic arrays and other hardware devices can likewise be constructed to implement some or all of the example methods and/or apparatus described herein, either in whole or in part. Furthermore, alternative software implementations including, but not limited to, distributed processing or component/object distributed processing, parallel processing, or virtual machine processing can also be constructed to implement the example methods and/or apparatus described herein.

It should also be noted that the example software and/or firmware implementations described herein are optionally stored on a tangible storage medium, such as: a magnetic medium (e.g., a magnetic disk or tape); a magneto-optical or optical medium such as an optical disk; or a solid state medium such as a memory card or other package that houses one or more read-only (non-volatile) memories, random access memories, or other re-writable (volatile) memories; or a signal containing computer instructions. A digital file attached to e-mail or other information archive or set of archives is considered a distribution medium equivalent to a tangible storage medium. Accordingly, the example software and/or firmware described herein can be stored on a tangible storage medium or distribution medium such as those described above or successor storage media.

To the extent the above specification describes example components and functions with reference to particular standards and protocols, it is understood that the scope of this patent is not limited to such standards and protocols. For instance, each of the standards for Internet and other packet switched network transmission (e.g., Transmission Control Protocol (TCP)/Internet Protocol (IP), User Datagram Protocol (UDP)/IP, HyperText Markup Language (HTML), HyperText Transfer Protocol (HTTP)) represent examples of the current state of the art. Such standards are periodically superseded by faster or more efficient equivalents having the same general functionality. Accordingly, replacement standards and protocols having the same functions are equivalents which are contemplated by this patent and are intended to be included within the scope of the accompanying claims.

Additionally, although this patent discloses example systems including software or firmware executed on hardware, it should be noted that such systems are merely illustrative and should not be considered as limiting. For example, it is contemplated that any or all of these hardware and software components could be embodied exclusively in hardware, exclusively in software, exclusively in firmware or in some combination of hardware, firmware and/or software. Accordingly, while the above specification described example systems, methods and articles of manufacture, persons of ordinary skill in the art will readily appreciate that the examples are not the only way to implement such systems, methods and articles of manufacture. Therefore, although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A computer implemented method to represent data using a probabilistic histogram, the method comprising:
    electronically partitioning a plurality of ordered data items into a plurality of buckets, each of the data items having a data value from a plurality of possible data values with a probability characterized by a respective individual probability distribution function, each bucket associated with a respective subset of the plurality of ordered data items bounded by a respective beginning data item and a respective ending data item; and
    electronically determining a first representative probability distribution function for a first bucket associated with a first subset of the plurality of ordered data items by partitioning the plurality of possible data values into a first plurality of representative data ranges and respective representative probabilities based on an error between the first representative probability distribution function and a first plurality of individual probability distribution functions characterizing the first subset of the plurality of ordered data items, wherein the method further comprises:
    electronically determining a plurality of representative value errors based on a distance metric, the plurality of representative value errors corresponding to a respective plurality of possible representative data ranges and respective possible representative probabilities;
    electronically determining a plurality of representative probability distribution function errors based on the plurality of representative value errors, the plurality of representative probability distribution function errors corresponding to a respective plurality of possible representative probability distribution functions associated with a respective plurality of possible buckets, each possible bucket bounded by a respective possible beginning data item and a respective possible ending data item; and
    electronically partitioning the plurality of ordered data items into the plurality of buckets and electronically determining the first representative probability distribution function based on the plurality of representative probability distribution function errors, the respective plurality of possible representative probability distribution functions, and the respective plurality of possible buckets, the plurality of buckets being selected from the plurality of possible buckets, the first representative probability distribution function being selected from the plurality of possible representative probability distribution functions.

2. The method as defined in claim 1 further comprising electronically determining a second representative probability distribution function for a second bucket associated with a second subset of the plurality of ordered data items by partitioning the plurality of possible data values into a second plurality of representative data ranges and respective representative probabilities based on an error between the second representative probability distribution function and a second plurality of individual probability distribution functions characterizing the second subset of the plurality of ordered data items, the second representative probability distribution function being different from the first representative probability distribution function.

3. The method as defined in claim 1 further comprising specifying a total number of the plurality of buckets; and
    electronically determining a respective plurality of representative probability distribution functions for the plurality of buckets, each representative probability distribution function determined by partitioning the plurality of possible data values into a plurality of representative data ranges and respective representative probabilities, each representative probability distribution function having a same number of representative data ranges and respective representative probabilities that is smaller than a total number of possible data values.

4. The method as defined in claim 1 further comprising:
    specifying a total number of representative data ranges and respective representative probabilities to be included among a plurality of representative probability distribution functions to be determined for the plurality of buckets; and
    electronically partitioning the plurality of ordered data items into the plurality of buckets based on requiring at most the specified total number of representative data ranges and respective representative probabilities to be included among all of the plurality of representative probability distribution functions determined for the plurality of buckets.

5. The method as defined in claim 1 wherein dynamic programming is used to implement at least one of (1) electronically determining the plurality of representative value errors corresponding to the respective plurality of possible representative data ranges and respective possible representative probabilities, (2) electronically determining the plurality of representative probability distribution function errors corresponding to the respective plurality of possible representative probability distribution functions associated with the respective plurality of possible buckets or (3) electronically partitioning the plurality of ordered data items into the plurality of buckets and electronically determining the first representative probability distribution function.

6. The method as defined in claim 1 wherein the distance metric corresponds to at least one of a variation distance, a sum squared error, a Kullback-Liebler divergence, a Hellinger distance, a maximum error metric or an earth-mover's distance.

7. The method as defined in claim 1 wherein the error between the first representative probability distribution function and the first plurality of individual probability distribution functions corresponds to at least one of a sum error metric or a maximum error metric.

8. The method as defined in claim 1 further comprising electronically combining the first representative probability distribution function for the first bucket with a second representative probability distribution function determined for a second bucket in response to a query of a database storing the plurality of ordered data items.

9. The method as defined in claim 1 wherein the plurality of ordered data items is a first plurality of ordered data items and the plurality of buckets is a first plurality of buckets, and further comprising:
   electronically partitioning a second plurality of ordered data items into a second plurality of buckets;
   electronically determining a second representative probability distribution function for a second bucket in the second plurality of buckets; and
   in response to a query of a database storing the plurality of ordered data items, electronically combining (1) the first bucket and the second bucket, and (2) the first representative probability distribution function for the first bucket with the second representative probability distribution function for the second bucket.

10. A tangible machine readable storage medium storing machine readable instructions which, when executed, cause a machine to at least:
   partition a plurality of ordered data items into a plurality of buckets, each data item having a particular value from a plurality of possible data values with a probability characterized by a respective individual probability distribution function, each bucket associated with a respective subset of the plurality of ordered data items bounded by a respective beginning data item and a respective ending data item; and
   determine a first representative probability distribution function for a first bucket associated with a first subset of the plurality of ordered data items by partitioning the plurality of possible data values into a first plurality of representative data ranges and respective representative probabilities based on an error between the first representative probability distribution function and a first plurality of individual probability distribution functions characterizing the first subset of the plurality of ordered data items, wherein the machine readable instructions, when executed, further cause the machine to:
   determine a plurality of representative value errors based on a distance metric, the plurality of representative value errors corresponding to a respective plurality of possible representative data ranges and respective possible representative probabilities;
   determine a plurality of representative probability distribution function errors based on the plurality of representative value errors, the plurality of representative probability distribution function errors corresponding to a respective plurality of possible representative probability distribution functions associated with a respective plurality of possible buckets, each possible bucket bounded by a respective possible beginning data item and a respective possible ending data item; and
   partition the plurality of ordered data items into the plurality of buckets and electronically determining the first representative probability distribution function based on the plurality of representative probability distribution function errors, the respective plurality of possible representative probability distribution functions, and the respective plurality of possible buckets, the plurality of buckets being selected from the plurality of possible buckets, the first representative probability distribution function being selected from the plurality of possible representative probability distribution functions.

11. The tangible machine readable storage medium as defined in claim 10 wherein the machine readable instructions, when executed, further cause the machine to determine a second representative probability distribution function for a second bucket associated with a second subset of the plurality of ordered data items by partitioning the plurality of possible data values into a second plurality of representative data ranges and respective representative probabilities based on an error between the second representative probability distribution function and a second plurality of individual probability distribution functions characterizing the second subset of the plurality of ordered data items, the second representative probability distribution function being different from the first representative probability distribution function.

12. The tangible machine readable storage medium as defined in claim 10 wherein the machine readable instructions, when executed, further cause the machine to determine a respective plurality of representative probability distribution functions for a specified total number of the plurality of buckets by partitioning the plurality of possible data values into a plurality of representative data ranges and respective representative probabilities, each representative probability distribution function having a same number of representative data ranges and respective representative probabilities that is smaller than a total number of possible data values.

13. The tangible machine readable storage medium as defined in claim 10 wherein the machine readable instructions, when executed, further cause the machine to partition the plurality of ordered data items into the plurality of buckets based on requiring at most a specified total number of representative data ranges and respective representative probabilities to be included among all of the respective plurality of representative probability distribution functions determined for the plurality of buckets.

14. The tangible machine readable storage medium as defined in claim 10 wherein the machine readable instructions, when executed, further cause the machine to combine the first representative probability distribution function and a second representative probability distribution function in response to a query of a database storing the plurality of ordered data items.

15. An apparatus to represent data using a probabilistic histogram, the apparatus comprising:
   a probabilistic database to store a plurality of ordered data items, each data item having a particular value from a plurality of possible data values with a probability characterized by a respective individual probability distribution function; and
   a probabilistic histogram generator to:
   partition the plurality of ordered data items into a plurality of buckets of the probabilistic histogram, each bucket associated with a respective subset of the plurality of ordered data items bounded by a respective beginning data item and a respective ending data item; and determine a representative probability distribution function for each bucket in the plurality of buckets, a first representative probability distribution function for a first bucket determined by partitioning the plurality of possible data values into a respective plurality of representative data ranges and respective representative probabilities to reduce an error between the particular representative probability distribution function and a plurality of individual probability distribution functions characterizing the respective subset of the plurality of ordered data items associated with the particular bucket, wherein the probabilistic histogram generator comprises:

a representative error processor to determine a plurality of representative value errors based on a distance metric, the plurality of representative value errors corresponding to a respective plurality of possible representative data ranges and respective possible representative probabilities;

a bucket error processor to determine a plurality of representative probability distribution function errors based on the plurality of representative value errors, the plurality of representative probability distribution function errors corresponding to a respective plurality of possible representative probability distribution functions associated with a respective plurality of possible buckets, each possible bucket represented by a respective possible beginning data item and a respective possible ending data item;

a histogram error processor to determine a plurality of histogram errors based on the plurality of representative probability distribution function errors; and a probabilistic histogram selector to select the plurality of buckets from the plurality of possible buckets and to select the representative probability distribution function for each bucket in the plurality of buckets from the plurality of possible representative probability distribution functions based on the plurality of histogram errors.

16. The apparatus as defined in claim 15 further comprising:

a query interface to receive a query; and a post-processor to combine a first representative probability distribution function and a second representative probability distribution function based on the query.

17. The apparatus as defined in claim 15 wherein the distance metric corresponds to at least one of a variation distance, a sum squared error, a Kullback-Liebler divergence, a Hellinger distance, a maximum error metric or an earthmover's distance.

18. The apparatus as defined in claim 15 wherein the probabilistic histogram generator is to minimize the error between the particular representative probability distribution function and the plurality of individual probability distribution functions, and wherein the error between the particular representative probability distribution function and the plurality of individual probability distribution functions corresponds to at least one of a sum error metric or a maximum error metric.

* * * * *